(12) United States Patent
Shirokura et al.

(10) Patent No.: US 9,358,901 B2
(45) Date of Patent: Jun. 7, 2016

(54) INVERTED PENDULUM TYPE VEHICLE

(71) Applicant: HONDA MOTOR CO., LTD., Minato-ku, Tokyo (JP)

(72) Inventors: Shinya Shirokura, Saitama (JP); Kazumasa Ozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/639,321

(22) Filed: Mar. 5, 2015

(65) Prior Publication Data

US 2015/0251563 A1 Sep. 10, 2015

(30) Foreign Application Priority Data

Mar. 7, 2014 (JP) ................. 2014-045762

(51) Int. Cl.
*B60L 9/00* (2006.01)
*B60L 11/00* (2006.01)
*G05D 1/00* (2006.01)
*G05D 3/00* (2006.01)
(Continued)

(52) U.S. Cl.
CPC ............. *B60L 15/20* (2013.01); *B60L 15/38* (2013.01); *B62K 1/00* (2013.01); *B62K 3/007* (2013.01); *G05D 1/0891* (2013.01); *B60B 3/048* (2013.01); *B60B 19/12* (2013.01); *Y02T 10/7258* (2013.01)

(58) Field of Classification Search
CPC ........ B62K 3/007; B62K 15/008; B62K 1/00; B62K 5/06; B62K 19/40; B62K 11/02; B62K 21/12; B62K 5/027; B62K 3/002; B60L 2240/622; B60L 11/16; B60L 3/12; B60L 15/38; B60L 11/185; B60L 11/182; B60L 2240/429; B60L 3/04; B60L 3/108; B60L 15/32; B60L 7/12; B60L 15/20; G05D 1/0255; G05D 1/024; G05D 1/021; G05D 1/0274; G05D 1/001; B60R 2021/01315; B60R 16/037; B60R 21/203; B60R 22/20; B60R 25/04; B60R 25/257
USPC ......... 701/1, 41, 2, 70, 20, 22, 23, 37, 28, 38, 701/89, 117, 74, 78, 82, 51
See application file for complete search history.

(56) References Cited

U.S. PATENT DOCUMENTS 5,314,034 A * 5/1994 Chittal ................. B62D 37/06 180/21
6,796,396 B2 * 9/2004 Kamen ................. A63C 17/12 180/272

(Continued)

FOREIGN PATENT DOCUMENTS

JP 2012-126257 A 7/2012
WO 2011/033580 A1 3/2011

*Primary Examiner* — Calvin Cheung
*Assistant Examiner* — Luis A Martinez Borrero
(74) *Attorney, Agent, or Firm* — Carrier Blackman & Associates, P.C.; William D. Blackman; Jingli Wang

(57) ABSTRACT

Provided is an inverted pendulum type vehicle capable of properly estimating whether or not a rider is thereon and controlling the travel of the vehicle by reflecting the result of the estimation. An inverted pendulum type vehicle 1, in which a traveling unit is driven by electric motors 31R, 31L, includes an occupied/unoccupied estimating unit (a first estimating unit) 62, which estimates whether or not a rider is on the vehicle 1 based on the observation values of the energizing currents of the electric motors 31R, 31L. A control unit 50 controls the operations of the electric motors 31R, 31L according to the estimation result of the estimating unit 62.

11 Claims, 14 Drawing Sheets

(51) Int. Cl.
*G06F 7/00* (2006.01)
*G06F 17/00* (2006.01)
B60L 15/20 (2006.01)
B60L 15/38 (2006.01)
B62K 1/00 (2006.01)
*G05D 1/08* (2006.01)
B62K 3/00 (2006.01)
*B60B 3/04* (2006.01)
*B60B 19/12* (2006.01)

(56) References Cited

U.S. PATENT DOCUMENTS

| | | | | |
|---|---|---|---|---|
| 7,178,614 B2* | 2/2007 | Ishii | | B60K 1/02 180/218 |
| 7,812,715 B2* | 10/2010 | Kamen | | A63C 17/01 180/171 |
| 7,963,352 B2* | 6/2011 | Alexander | | B62K 3/007 180/21 |
| 8,014,923 B2* | 9/2011 | Ishii | | B62D 51/005 180/218 |
| 8,335,612 B2* | 12/2012 | Tsuji | | B62K 1/00 180/10 |
| 8,522,902 B2* | 9/2013 | Gomi | | B62J 1/005 180/208 |
| 8,527,154 B2* | 9/2013 | Akimoto | | B62K 3/007 701/49 |
| 8,751,110 B2* | 6/2014 | Takenaka | | B62D 11/003 180/218 |
| 8,800,697 B2* | 8/2014 | Hoffmann | | B60T 7/042 180/21 |
| 8,825,254 B2* | 9/2014 | Kobashi | | B62K 3/007 701/22 |
| 8,843,271 B2* | 9/2014 | Takenaka | | B62K 3/007 180/21 |
| 9,085,334 B2* | 7/2015 | Hoffmann | | B62K 3/007 |
| 2003/0155167 A1* | 8/2003 | Kamen | | A63C 17/12 180/272 |
| 2005/0121866 A1* | 6/2005 | Kamen | | A63C 17/01 280/47.18 |
| 2007/0158117 A1* | 7/2007 | Alexander | | B62K 3/007 180/21 |
| 2007/0296170 A1* | 12/2007 | Field | | A63C 17/01 280/47.131 |
| 2009/0107240 A1* | 4/2009 | Senba | | A61G 5/04 73/514.36 |
| 2010/0017069 A1* | 1/2010 | Miki | | B60N 2/0244 701/48 |
| 2010/0114468 A1* | 5/2010 | Field | | B60N 2/045 701/124 |
| 2011/0010013 A1* | 1/2011 | Ruan | | B25J 5/007 700/261 |
| 2011/0056757 A1* | 3/2011 | Polutnik | | B62K 1/00 180/65.51 |
| 2011/0067937 A1* | 3/2011 | Gomi | | B60B 19/003 180/21 |
| 2011/0067938 A1* | 3/2011 | Gomi | | B60L 11/18 180/21 |
| 2011/0068738 A1* | 3/2011 | Gomi | | B62J 1/005 320/108 |
| 2011/0115279 A1* | 5/2011 | Gomi | | B60B 19/003 301/5.23 |
| 2011/0191013 A1* | 8/2011 | Leeser | | B62D 11/04 701/124 |
| 2012/0158208 A1* | 6/2012 | Kawamoto | | B62K 3/007 701/1 |
| 2012/0158255 A1* | 6/2012 | Takenaka | | B60L 3/048 701/49 |
| 2012/0166049 A1* | 6/2012 | Akimoto | | B62K 3/007 701/49 |
| 2012/0168235 A1* | 7/2012 | Gomi | | B62J 1/005 180/21 |
| 2012/0172169 A1* | 7/2012 | Gomi | | B60B 3/048 475/197 |
| 2012/0173041 A1* | 7/2012 | Takenaka | | B62J 1/005 701/1 |
| 2012/0173088 A1* | 7/2012 | Kobashi | | B60B 3/048 701/49 |
| 2012/0173108 A1* | 7/2012 | Takenaka | | B62J 25/00 701/70 |
| 2012/0173109 A1* | 7/2012 | Akimoto | | B62K 1/00 701/70 |
| 2012/0173114 A1* | 7/2012 | Takenaka | | B62K 1/00 701/99 |
| 2012/0175175 A1* | 7/2012 | Gomi | | B62J 1/005 180/21 |
| 2012/0175176 A1* | 7/2012 | Hamaya | | B62J 1/005 180/21 |
| 2012/0179352 A1* | 7/2012 | Takenaka | | B62J 1/00 701/99 |
| 2012/0217072 A1* | 8/2012 | Hoffmann | | B60T 7/042 180/21 |
| 2014/0058600 A1* | 2/2014 | Hoffmann | | B62K 3/007 701/22 |

* cited by examiner

INVERTED PENDULUM TYPE VEHICLE

BACKGROUND OF THE INVENTION

1. Field of the Invention

The present invention relates to an inverted pendulum type vehicle.

2. Description of the Related Art

There has conventionally been known an inverted pendulum type vehicle in which a rider mounting section, which is tiltable with respect to a vertical direction, is installed to a base body to which a traveling unit capable of traveling on a floor surface in all directions and an electric motor that drives the traveling unit are installed. The inverted pendulum vehicles of this type are described in, for example, Japanese Patent Application Laid-Open No. 2012-126257 (hereinafter referred to as Patent Document 1) and PCT International Publication No. WO2011/033580 (hereinafter referred to as Patent Document 2)).

In this type of an inverted pendulum type vehicle, the operation of the electric motor is controlled to control the travel of the traveling unit, thereby controlling the posture, i.e. the tilting state, of the rider mounting section.

The total mass of an inverted pendulum type vehicle (hereinafter referred to simply as "the vehicle" in some cases) differs between a state in which a rider is on the vehicle (hereinafter referred to as "the occupied state" in some cases) and a state in which a rider is not on the vehicle (hereinafter referred to as "the unoccupied" in some cases). Thus, a reaction force acting on the inverted pendulum type vehicle from a floor surface differs. Hence, the behavior characteristics of the vehicle differ depending on whether the vehicle is occupied or unoccupied.

Therefore, Patent Document 2 mentioned above proposes a technique in which a load sensor provided in a rider mounting section is used to detect whether the vehicle is occupied or unoccupied, and a gain value for feedback control is adjusted according to a result of the detection.

However, depending on how the rider rides on the vehicle, the rider does not always ride on the rider mounting section such that his or her weight is applied to the load sensor. Further, depending on the mounting position or mounting posture of the rider relative to the vehicle, there are cases where the load of the weight of the rider is not sufficiently applied to the load sensor. In such a case, the occupied state may be erroneously determined as the unoccupied state.

If such an erroneous determination is made, then the travel control will be inconveniently carried out on the traveling unit in a manner corresponding to the unoccupied state whereas the vehicle is actually occupied.

Patent Document 1 does not describe a technique fir properly detecting whether or not a rider is on the vehicle.

SUMMARY OF THE INVENTION

The present invention has been made in view of the foregoing background, and it is an object of the invention to provide an inverted pendulum type vehicle capable of properly estimating whether or not a rider is on the vehicle and of carrying out travel control based on a result of the estimation.

To this end, an inverted pendulum type vehicle in accordance with the present invention has a traveling unit capable of traveling on a floor surface in all directions, an electric motor that drives the traveling unit, a base body to which the traveling unit and the electric motor are installed, a rider mounting unit installed to the base body tiltably with respect to a vertical direction, and a control unit that controls an operation of the electric motor, including:

a first estimating unit that estimates whether or not a rider is on the vehicle on the basis of at least an observation value of an energizing current of the electric motor, wherein the control unit is configured to control the operation of the electric motor according to an estimation result of the first estimating unit (a first aspect of the invention).

In the present invention, the term "floor" will be used not only to mean a floor, such as an indoor floor, in a commonly used sense but also to mean an outdoor ground surface or a road surface.

Further, in the present invention, "the observation value" of any state quantity, such as velocity and angle, will mean a detection value (measurement value) of the state quantity obtained by an appropriate sensor, or an estimated value that is estimated from the detection values (measurement values) of one or more other state quantities having a certain correlation with the foregoing state quantity based on the correlation, or a quasi-estimated value that coincides with or can be regarded to substantially coincide with an actual value of the state quantity.

In this case, regarding the quasi-estimated value, if, for example, an actual value of the state quantity is known to accurately follow a desired value of the state quantity, then the desired value can be used as the quasi-estimated value.

According to the first aspect of the invention described above, the first estimating unit estimates whether or not the rider is on the vehicle based on at least the observation value of the energizing current of the electric motor.

In the present invention, the state in which the rider is on the vehicle means a state in which the rider is on the vehicle such that the gravity by the weight of the rider acts on the vehicle.

Therefore, the actual driving force for the traveling unit to travel differs between the state in which a rider is on the vehicle and the state in which a rider is not on the vehicle even if the traveling behavior of the traveling unit on a floor surface is the same. Further, the electric motor outputs a driving force based on the energizing current.

Hence, the first estimating unit is capable of properly estimating whether or not the rider is on the vehicle based on the observation value of the energizing current of the electric motor rather than based on the mounting position, the mounting posture or the like of the rider on the rider mounting section. Further, in this case, whether or not the rider is on the vehicle can be estimated without the need for a sensor exclusively used for the estimation.

Further, the control unit is configured to control the operation of the electric motor according to an estimation result of the first estimating unit. Thus, a proper estimation result of the first estimating unit is reflected in carrying out the travel control of the traveling unit.

Accordingly, the first aspect of the invention makes it possible to properly estimate whether or not the rider is on and the estimation result is reflected in carrying out the travel control. In addition, the restrictions on the mounting posture of the rider relative to the vehicle can be mitigated.

In the foregoing first aspect of the invention, further preferably, the first estimating unit is configured to estimate whether or not a rider is on the vehicle based on an observation value of the energizing current of the electric motor and a current command value, which is a command value of the energizing current of the electric motor determined by the control unit (a second aspect of the invention).

According to the second aspect of the invention, the first estimating unit estimates whether or not a rider is on the vehicle by taking into account the command value of the energizing current of the electric motor in addition to the observation value of the energizing current of the electric motor.

This permits further enhanced reliability of the result of estimation on whether or not a rider is on the vehicle.

In the second aspect of the invention, more specifically, the first estimating unit is preferably configured to calculate an acceleration/deceleration current component of the current command value, which acceleration/deceleration current component is for increasing/decreasing a driving force output by the electric motor, and to estimate whether or not a rider is on the vehicle based on a reference current value obtained by subtracting the acceleration/deceleration current component from the observation value of the energizing current (a third aspect of the invention).

According to the third aspect of the invention, the reference current value obtained by subtracting the acceleration/deceleration current component from the observation value of the energizing current corresponds to a value obtained by removing a transient fluctuation component from the observation value of the energizing current.

Hence, the foregoing reference current value easily changes depending on whether or not a rider is on the vehicle. Thus, estimating whether or not a rider is on the vehicle based on the reference current value makes it possible to properly enhance the reliability of the estimation result.

Further, in the present invention, a drive system of the traveling unit may adopt the following configuration. For example, the drive system includes two of the foregoing electric motors, and a power transmission system between the traveling unit and the two electric motors is configured such that a driving force for moving the traveling unit in a first direction (the first direction and a second direction being included in the foregoing all directions and being orthogonal to each other) is generated based on the total sum of the driving forces output from the two electric motors, and a driving force for moving the traveling unit in the second direction is generated based on the difference between the driving forces output by the two electric motors.

In the case where the drive system of the traveling unit is configured as described above, generally, a component of the driving forces output from the two electric motors that contributes to the travel of the traveling unit in the first direction and a component thereof that contributes to the travel of the traveling unit in the second direction usually differ in how the difference between these components takes place according to whether or not a rider is on the vehicle due to, for example, a difference between the efficiency of the conversion of the driving forces output by the two electric motors into the driving force for moving the traveling unit in the first direction and the efficiency of the conversion thereof into the driving force for moving the traveling unit in the second direction.

Thus, in the foregoing first aspect of the invention, if the drive system of the traveling unit is configured as described above, then the first estimating unit is preferably configured to convert a pair of observation values of the energizing currents of the two electric motors into a pair of a first direction reference current value, which denotes a current component that generates the driving force for moving the traveling unit in the first direction and a second direction reference current value, which denotes a current component that generates the driving force for moving the traveling unit in the second direction, and to estimate whether or not a rider is on the vehicle based on the first direction reference current value and the second direction reference current value (a fourth aspect of the invention).

Further, in the foregoing second aspect of the invention, if the drive system of the traveling unit is configured as described above, then the first estimating unit is preferably configured to carry out processing of converting a pair of the observation values of the energizing currents of the two electric motors into a pair of a first direction current value, which denotes a current component that generates the driving force for moving the traveling unit in the first direction and a second direction current value, which denotes a current component that generates the driving force for moving the traveling unit in the second direction, processing of calculating acceleration/deceleration current components of current command values of the two electric motors, the acceleration/deceleration current components being for increasing/decreasing the driving forces output by the electric motors, and processing of converting a pair of the acceleration/deceleration current components of the two electric motors into a pair of a first direction acceleration/deceleration current value, which denotes a current component that generates a driving force for moving the traveling unit in the first direction, and a second direction acceleration/deceleration current value, which denotes a current component that generates a driving force for moving the traveling unit in the second direction, and to estimate whether or not a rider is on the vehicle based on a first direction reference current value obtained by subtracting the first direction acceleration/deceleration current value from the first direction current value and a second direction reference current value obtained by subtracting the second direction acceleration/deceleration current value from the second direction current value (a fifth aspect of the invention).

Further, in the third aspect of the invention, if a drive system of the traveling unit is configured as described above, then the first estimating unit is preferably configured to carry out processing of converting a pair of the reference current values calculated on the two electric motors into a pair of a first direction reference current value, which denotes a current component that generates a driving force for moving the traveling unit in the first direction and a second direction reference current value, which denotes a current component that generates a driving force for moving the traveling unit in the second direction, and to estimate whether or not a rider is on the vehicle based on the first direction reference current value and the second direction reference current value (a sixth aspect of the invention).

According to the fourth to the sixth aspects of the invention described above, whether or not a rider is on the vehicle is estimated based on the first direction reference current value corresponding to the driving force for moving the traveling unit in the first direction and the second direction reference current value corresponding to the driving force for moving the traveling unit in the second direction.

This arrangement makes it possible to ideally carry out the estimation in the traveling unit having the drive system of the traveling unit configured as described above. This permits higher reliability of estimation results.

Especially in the fifth aspect of the invention and the sixth aspect of the invention, it is possible to prevent the transient fluctuation components included in the observation values of the energizing currents from affecting or to hardly affect the first direction reference current value and the second direction reference current value. This permits ideally enhanced reliability of estimation results based on the first direction reference current value and the second direction reference current value.

Further, in the fourth aspect of the invention, the first estimating unit is configured, fir example, to estimate whether or not a rider is on the vehicle based on a first a reference value obtained by smoothing the first direction reference current value, a first b reference value obtained by smoothing a value denoting the magnitude of the first direction reference current value, a second a reference value obtained by smoothing the second direction reference current value, and a second b reference value obtained by smoothing a value denoting the magnitude of the second direction reference current value (a seventh aspect of the invention). This configuration available for the first estimating unit applies in the same manner to the fifth aspect of the invention and the sixth aspect of the invention (an eighth aspect of the invention and a ninth aspect of the invention)

According to various experiments and studies carried out by the inventors of the present application, whether or not a rider is on the vehicle can be estimated with high reliability based on the first a reference value, the first b reference value, the second a reference value, and the second b reference value (e.g. by comparing these reference values with predetermined values).

The foregoing smoothing is accomplished by averaging procedure based on moving average or the like, or filtering processing of a low-pass characteristic.

Further, the first to the seventh aspects of the invention may further include a second estimating unit that estimates whether or not an oscillation phenomenon of the vehicle has occurred based on an estimation result of the first estimating unit, an observation value of a traveling velocity of the traveling unit, and an observation value of an inclination angular velocity of the rider mounting section, wherein the control unit may be configured to control the operation of the electric motor based on an estimation result of the second estimating unit (a tenth aspect of the invention).

The foregoing oscillation phenomenon is a phenomenon in which the oscillation of the traveling unit from a traveling operation and the oscillation of the rider mounting section from a tilt operation take place in synchronization. The oscillation phenomenon is more likely to occur in the case where a rider is not on a vehicle than in the case where the rider is on the vehicle.

According to the tenth aspect of the invention, the second estimating unit estimates whether or not the oscillation phenomenon has occurred based on an estimation result of the first estimating unit (an estimation result on whether or not a rider is on the vehicle) in addition to the observation value of the traveling velocity of the traveling unit and the observation value of the inclination angular velocity of the rider mounting section. This makes it possible to properly estimate whether or not the oscillation phenomenon has occurred in both the case where a rider is on the vehicle and the case where the rider is not on the vehicle.

Further, the control unit is configured to control the operation of the electric motor according to an estimation result of the second estimating unit. This makes it possible to properly control the travel of the traveling unit according to whether or not the oscillation phenomenon has occurred. For example, the operation of the electric motor can be controlled and the travel of the traveling unit can be consequently controlled to suppress the occurrence of the oscillation phenomenon.

The estimation processing by the second estimating unit is carried out by using an estimation result of the first estimating unit. Therefore, controlling the electric motor according to an estimation result of the second estimating unit will indirectly control the electric motor according to an estimation result of the first estimating unit.

In the foregoing tenth aspect of the invention, the control unit is preferably configured to control the operation of the electric motor according to an estimation result of the first estimating unit and an estimation result of the second estimating unit (an eleventh aspect of the invention).

According to the eleventh aspect of the invention, both the estimation result of the first estimating unit and the estimation result of the second estimating unit can be reflected on the travel control of the traveling unit. This makes it possible to carry out the travel control of the traveling unit suited to each of the case where a rider is on the vehicle, the case where a rider is not on the vehicle, the case where the oscillation phenomenon has occurred, and the case where the oscillation phenomenon has not occurred.

In the tenth aspect of the invention and the eleventh aspect of the invention described above, the second estimating unit is, more specifically, configured to, for example, determine a correlation reference value, which indicates the degree of correlation between a value obtained by passing a travel acceleration of the traveling unit, which has been calculated from the observation value of the traveling velocity of the traveling unit, through a filter of high pass characteristics and a value obtained by passing an observation value of the inclination angular velocity of the rider mounting section through a filter of high pass characteristics, and compare the correlation reference value with a threshold value set based on an estimation result of the first estimating unit so as to estimate whether or not the oscillation phenomenon of the vehicle has occurred (a twelfth aspect of the invention).

According to the twelfth aspect of the invention, whether or not the oscillation phenomenon of the vehicle has occurred can be estimated with high reliability in both the state in which a rider is on the vehicle (occupied state) and the state in which a rider is not on the vehicle (unoccupied state).

In the present invention described above, the control of the electric motor based on an estimation result of the first estimating unit and an estimation result of the second estimating unit is carried out, for example, as described below.

The control unit is configured to control the electric motor such that at least one of a change sensitivity of the travel acceleration of the traveling unit in response to a change in the observation value of the traveling velocity of the traveling unit, a change sensitivity of the travel acceleration of the traveling unit in response to a change in the observation value of the tilt angle of the rider mounting section, and a change sensitivity of the travel acceleration of the traveling unit in response to a change in the observation value of the inclination angular velocity of the rider mounting section can be changed according to an estimation result of the first estimating unit or an estimation result of the second estimating unit.

DESCRIPTION OF THE PREFERRED EMBODIMENTS

An embodiment of the present invention will be described below with reference to the accompanying drawings FIG. 1 to FIG. 14. Referring first to FIG. 1 to FIG. 4, the structure of an inverted pendulum type vehicle according to the present embodiment will be described.

Figure 1:
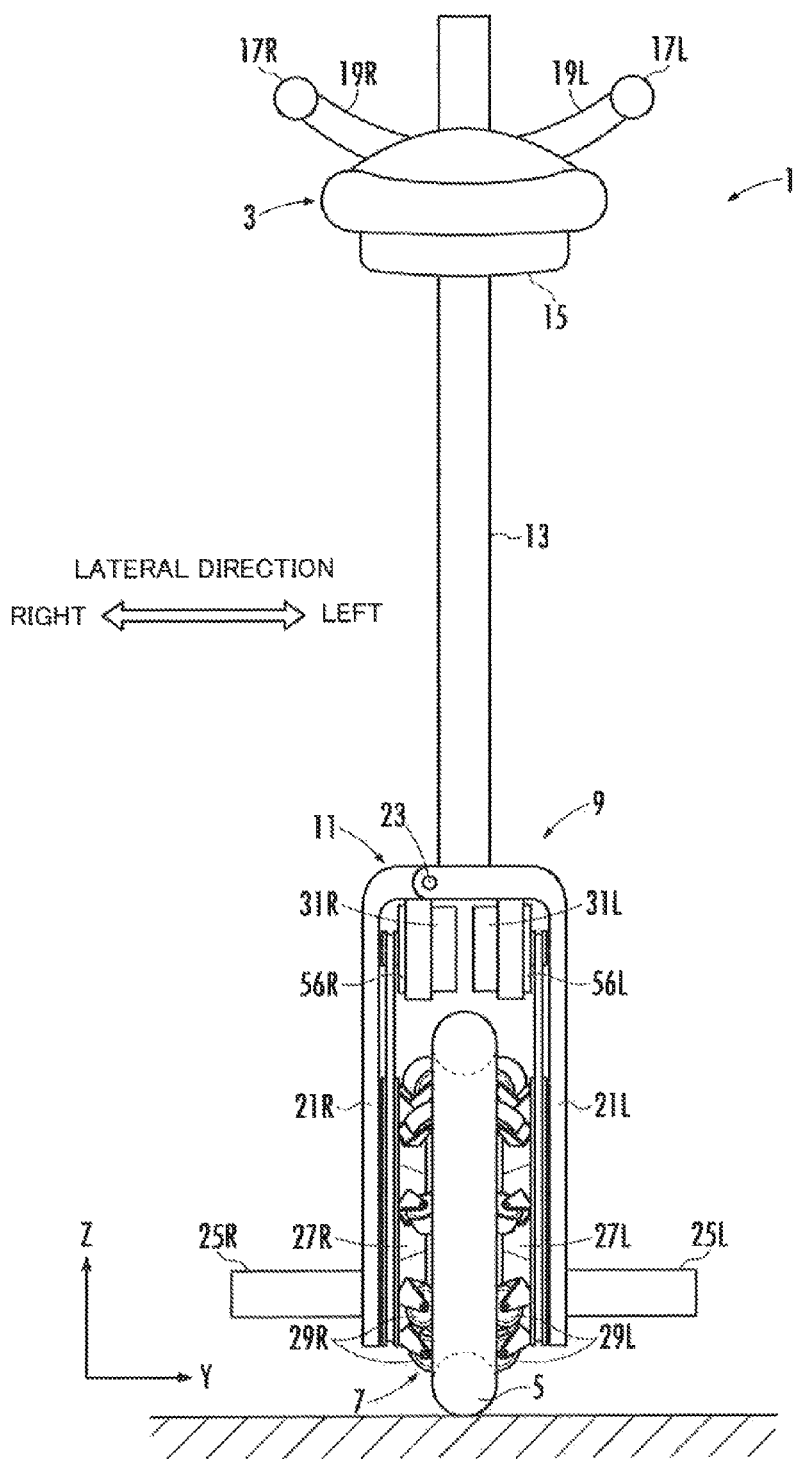
FIG. 1 is a front view of an inverted pendulum type vehicle according to an embodiment.
Figure 2:
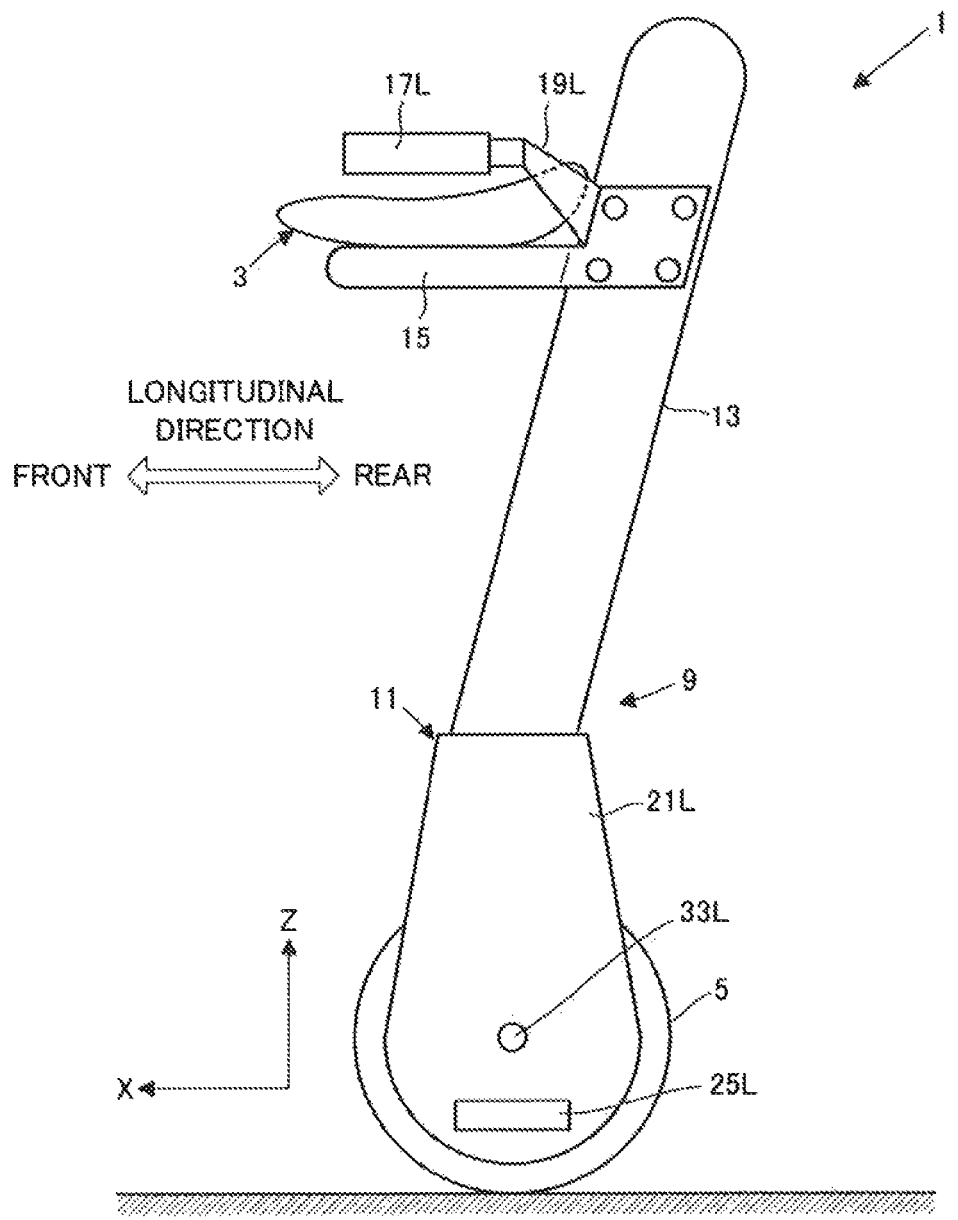
FIG. 2 is a side view of the inverted pendulum type vehicle according to the embodiment.

As illustrated in FIG. 1 and FIG. 2, an inverted pendulum type vehicle 1 of the present embodiment includes a rider mounting section 3 on which a rider (driver) rides, a traveling unit 5 capable of traveling in all directions on a floor surface while being in contact with the floor surface, an actuator unit 7 that drives the traveling unit 5, and a base body 9 to which the rider mounting section 3, the traveling unit 5 and the actuator unit 7 are installed.

The terms "lateral direction" in FIG. 1 and "longitudinal direction" in FIG. 2 indicate the directions used for the sake of convenience in describing the present embodiment. The lateral direction corresponds to the direction of an axial center C2 of a wheel unit 5, which will be discussed later, as the traveling unit 5 in an upright posture state (the rotational axis of the wheel of the wheel unit 5), and the longitudinal direction corresponds to the direction in which the wheel unit 5 travels by the wheel of the wheel unit 5 in the upright posture state.

In the description of the present embodiment, suffixes "R" and "L" attached to reference numerals will be used to mean correspondence to the right side and the left side of the vehicle 1.

The base body 9 includes a lower frame 11 to which the traveling unit 5 and the actuator unit 7 are installed, and a support frame 13 extendedly provided upward from the upper end of the lower frame 11.

The rider mounting section 3 (hereinafter referred to simply as the mounting section 3) is installed to the top portion of the support frame 13. The mounting section 3 in the present embodiment is a seat on which a rider sits. The mounting section 3 is secured to the support frame 13 through a seat frame 15.

Further, grips 17R, 17L to be gripped as necessary by a rider sitting on the mounting section 3 are disposed on both right and left sides of the mounting section 3. These grips 17R, 17L are secured to the support frame 13 or the seat frame 15 through brackets 19R, 19L, respectively. The grips 17R, 17L may be omitted.

The lower frame 11 has a pair of cover members 21R, 21L disposed in a bifurcated manner so as to oppose each other with an interval provided therebetween in the lateral direction. The upper end portions of these cover members 21R, 21L (the bifurcated portion) are connected through a hinge shaft 23 having an axial center in the longitudinal direction. Further, one of the cover members 21R, 21L is relatively swingable about the hinge shaft 23 with respect to the other. The cover members 21R, 21L are urged in a direction for narrowing the lower end portions (the distal end sides of the bifurcated portion) of the cover members 21R, 21L by a spring (not illustrated).

The outer surfaces of the cover members 21R, 21L have a step 25R on which the right foot of the rider sitting on the mounting section 3 is rested and a step 25L on which the left foot of the rider is rested. The steps 25R and 25L are provided, projecting rightward and leftward, respectively.

The traveling unit 5 and the actuator unit 7 are disposed between the cover members 21R, 21L of the lower frame 11. The structures of the traveling unit 5 and the actuator unit 7 will be described with reference to FIG. 3 and FIG. 4.

The traveling unit 5 is a circularly formed wheel unit made of a rubber-like elastic material and has a substantially circular cross sectional shape. The traveling unit 5 (hereinafter referred to as "the wheel unit 5") is adapted to be rotatable about a center C1 of the circular cross section (more specifically a circumferential line that passes through the circular cross sectional center C1 and is concentric with an axial center C2 of the wheel unit 5) by the elastic deformation thereof.

The wheel unit 5 is disposed between the cover members 21R, 21L with the axial center C2 thereof (the rotational axis of the wheel of the wheel unit 5) oriented in the direction of the interval between the cover members 21R, 21L. Further, the wheel unit 5 comes in contact with a floor surface at a lower end portion of the outer peripheral surface thereof.

The wheel unit 5 is capable of performing an operation of rotating about the axial center C2 of the wheel unit 5 (an operation of rolling on a floor surface) and an operation of rotating about the cross sectional center C1 of the wheel unit 5 by the drive carried out by the actuator unit 7, the detail of which will be discussed hereinafter. As a result, the wheel unit 5 is capable of traveling on a floor surface in all directions by an operation combining the foregoing rotating operations.

The actuator unit 7 includes a rotating member 27R and free rollers 29R provided between the wheel unit 5 and the right cover member 21R, a rotating member 27L and free rollers 29L provided between the wheel unit 5 and the left cover member 21L, an electric motor 31R disposed above the rotating member 27R and the free rollers 29R, and an electric motor 31L disposed above the rotating member 27L and the free rollers 29L.

The housings of the electric motors 31R, 31L are attached to the cover members 21R, 21L, respectively. Although not illustrated, the power sources (capacitors) of the electric motors 31R, 31L are mounted at appropriate locations, such as the support frame 13, of the base body 9.

The rotating member 27R is rotatably supported by the cover member 21R through a support shaft 33R, which has an axial center in the lateral direction. Similarly, the rotating member 27L is rotatably supported by the cover member 21L through a support shaft 33L, which has an axial center in the lateral direction. In this case, the rotational axis of the rotating member 27R. i.e. the axial center of the support shaft 33R, and the rotational axis of the rotating member 27L, i.e. the axial center of the support shaft 33L, are coaxial.

Figure 3:
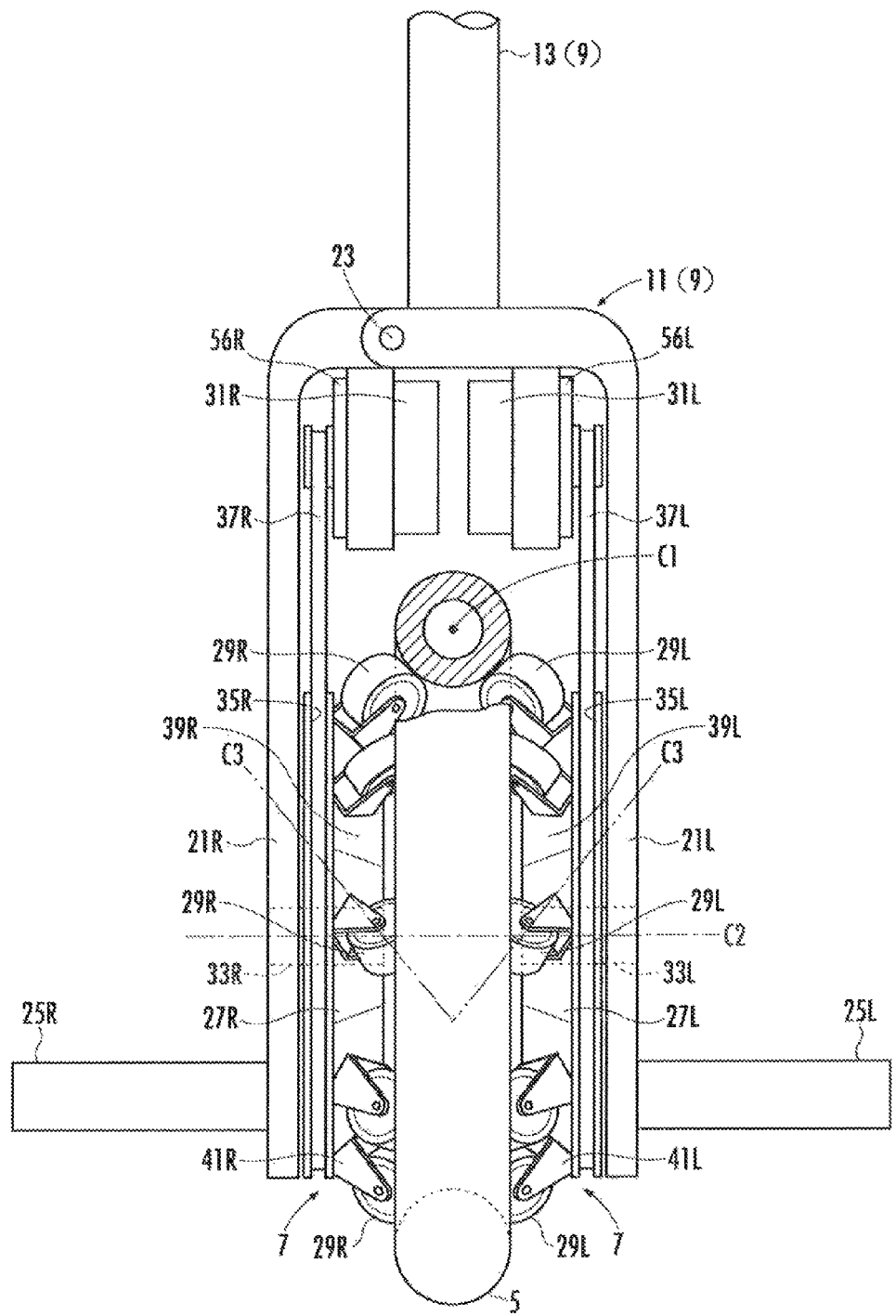
FIG. 3 is an enlarged view of an essential section of the inverted pendulum type vehicle according to the embodiment.
Figure 4:
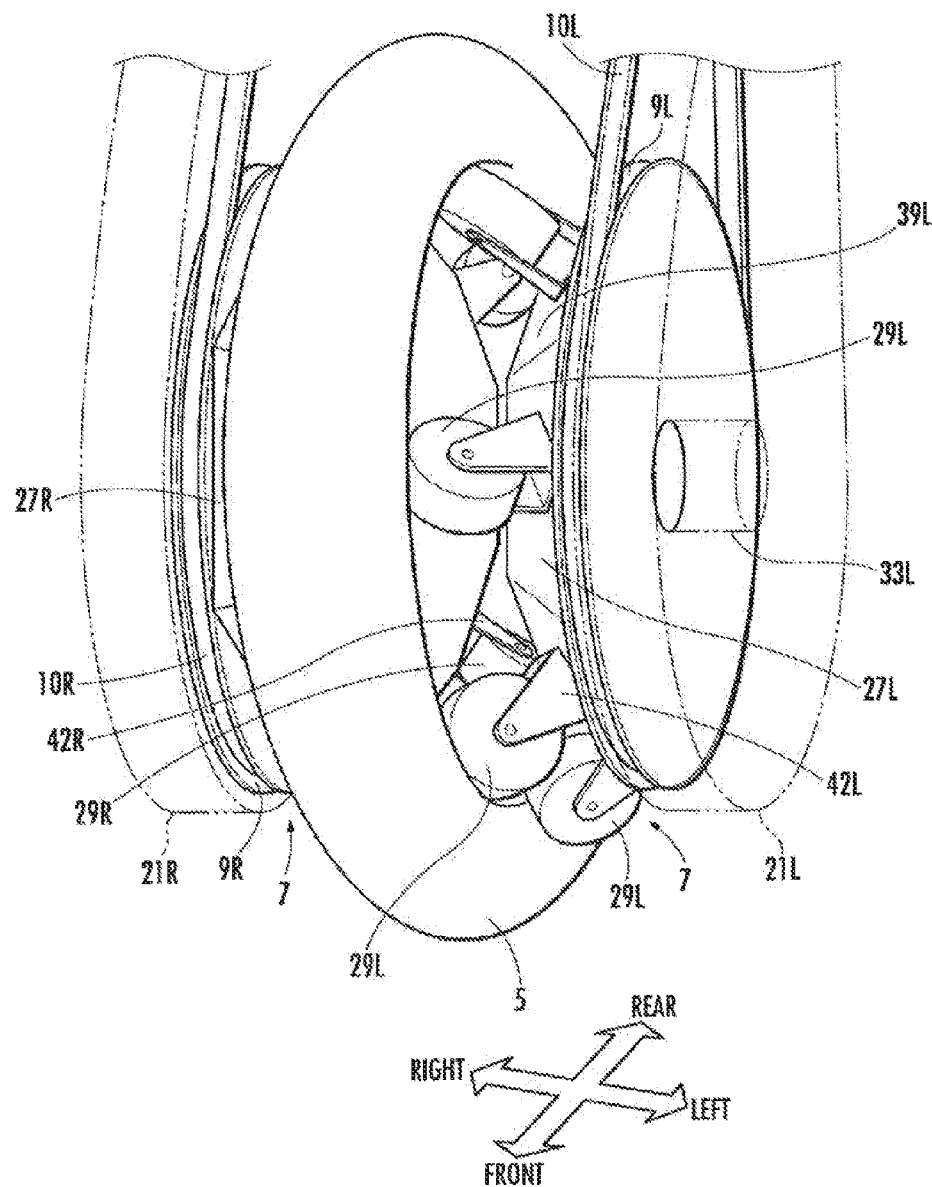
FIG. 4 is a perspective view of an essential section of the inverted pendulum type vehicle according to the embodiment.

The rotating members 27R, 27L are connected to the output shafts of the electric motors 31R 31L, respectively, through the intermediary of power transmission mechanisms that include functions as speed reducers. The power transmission mechanisms are, for example, pulley-belt type. More specifically, the rotating member 27R is connected to the output shaft of the electric motor 31R through the intermediary of a pulley 35R and a belt 37R, as illustrated in FIG. 3. Similarly, the rotating member 27L is connected to the output shaft of the electric motor 31L through the intermediary of a pulley 35L and a belt 37L. Thus, the rotating members 27R, 27L are rotationally driven by power (torque) transmitted from the electric motors 31R, 31L, respectively.

The foregoing power transmission mechanisms may be constituted of, for example, sprockets and link chains, or a plurality of gears. Further, for example, the electric motors 31R 31L may be disposed to face against the rotating members 27R, 27L such that the output shafts of the electric motors 31R, 31L are coaxial with the rotating members 27R, 27L. Further, the output shafts of the electric motors 31R, 31L may be connected to the rotating members 27R, 27L through speed reducers (planetary gear devices, wave gear devices or the like).

The rotating members 27R, 27L are formed to have shapes similar to those of truncated cones having the diameters thereof reducing toward the wheel unit 5. Further, the outer peripheral surfaces of the rotating members 27R, 27L constitute the tapered outer peripheral surfaces 39R, 39L.

A plurality of the free rollers 29R is arranged around the tapered outer peripheral surface 39R of the rotating member 27R such that the free rollers 29R are arranged in an equally spaced manner on a circumference that is concentric with the rotating member 27R. Each of the free rollers 29R is attached to the tapered outer peripheral surface 39R through a bracket 41R. Further, each of the free rollers 29R is rotatably supported by the bracket 41R.

Similarly, a plurality of the free rollers 29L of the same number as that of the free rollers 29R is arranged around the tapered outer peripheral surface 39L of the rotating member 27L such that the free rollers 29L are arranged in an equally spaced manner on a circumference that is concentric with the rotating member 27L. Each of the free rollers 29L is attached to the tapered outer peripheral surface 39L through a bracket 41L. Further, each of the free rollers 29L is rotatably supported by the bracket 41L.

The wheel unit 5 is disposed coaxially with the rotating members 27R, 27L, being sandwiched between the free rollers 29R on the rotating member 27R side and the free rollers 29L on the rotating member 27L side.

In this case, as illustrated in FIG. 1, each of the free rollers 29R, 29L is disposed in a posture in which an axial center C3 thereof tilts with respect to the axial center C2 of the wheel unit 5 and tilts with respect to the direction of the diameter of the wheel unit 5 (a radial direction for connecting the axial center C2 and the free rollers 29R, 29L when the wheel unit 5 is observed in the direction of the axial center C2). Further, in the foregoing posture, the outer peripheral surface of each of the free rollers 29R, 29L is pressed into contact aslant with the inner peripheral surface of the wheel unit 5.

More generally, the right free rollers 29R are pressed into contact with the inner peripheral surface of the wheel unit 5 in the posture that makes it possible to apply a frictional force component in the direction about the axial center C2 (a frictional force component in the tangential direction of the inner periphery of the wheel unit 5) and a frictional force component in the direction about the cross sectional center C1 of the wheel unit 5 (a frictional force component in the tangential direction of the circular cross section) to the wheel unit 5 at the surface of contact with the wheel unit 5 when the rotating member 27R is rotationally driven about the axial center C2. The same applies to the left free rollers 29L.

In this case, as described above, the cover members 21R, 21L are urged in a direction for narrowing the lower end portions (the distal end sides of the bifurcated portions) of the cover members 21R, 21L by a spring (not illustrated). Thus, the wheel unit 5 is sandwiched between the right free rollers 29R and the left free rollers 29L by the urging force, and the state in which the free rollers 29R, 29L are pressed against and in contact with the wheel unit 5 is maintained (more specifically, the state in which the free rollers 29R, 29L are pressed against and in contact with the wheel unit 5 such that a frictional force can be applied therebetween is maintained).

Figure 9:
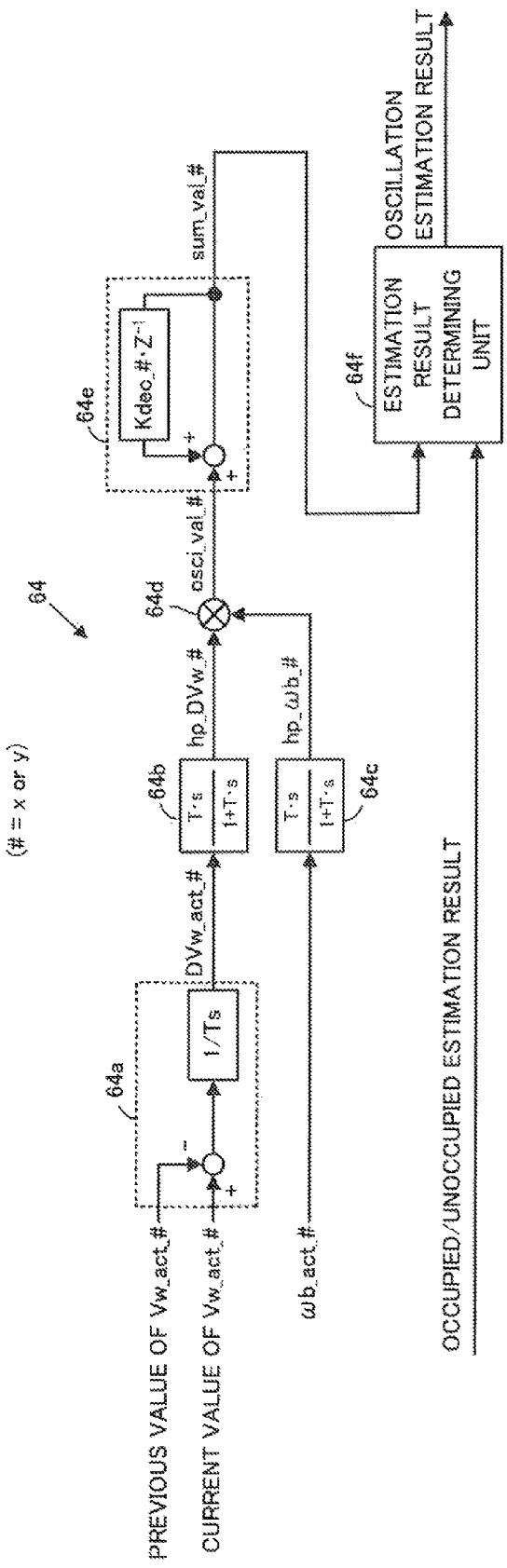
FIG. 9 is a block diagram illustrating the processing by an oscillation estimating unit illustrated in FIG. 5.
Figure 10:
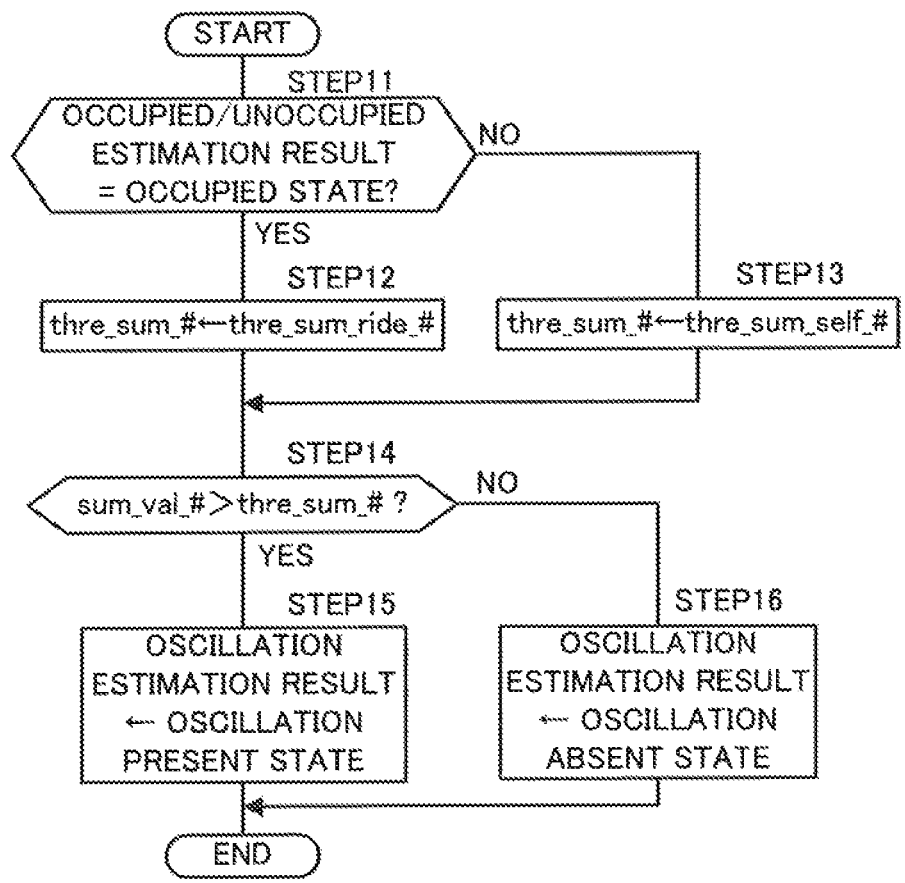
FIG. 10 is a flowchart illustrating the processing by the estimation result determining unit illustrated in FIG. 9.

Supplementarily, the wheel unit 5 may have a constitution in which a plurality of rollers rotatably supported by an annular member (a plurality of rollers having the rotational axes thereof oriented in the circumferential direction of the annular member) is arranged in the direction about the axial center of the annular member, as with the one illustrated in, for example, FIG. 9 and FIG. 10 in PCT International Publication No. WO2008/132778.

In the vehicle 1 having the constitution described above, the power transmission system between the electric motors 31R, 31L and the wheel unit 5 is configured as described above.

Therefore, if the rotating members 27R, 27L are rotationally driven in the same direction at a rotational velocity of the same magnitude by the electric motors 31R, 31L, respectively, then the wheel unit 5 will rotate about the axial center C2 in the same direction as that of the rotating members 27R, 27L. Thus, the wheel unit 5 will roll on the floor surface in the longitudinal direction, causing the vehicle 1 to travel in the longitudinal direction.

Further, if, for example, the rotating members 27R, 27L are rotationally driven in directions that are opposite from each other and at a rotational velocity of the same magnitude, then the wheel unit 5 will rotate about the cross sectional center C1. Thus, the wheel unit 5 will travel in the direction of the axial center C2, i.e. the lateral direction.

Further, if the rotating members 27R, 27L are rotationally driven in the same direction or in the directions opposite from each other at rotational velocities (rotational velocities including the directions) that are different from each other, then the wheel unit 5 will rotate about the axial center C2 and also rotate about the cross section center C1 at the same time.

The wheel unit 5 travels in directions aslant relative to the longitudinal direction and the lateral direction by the combined operations (composite operations) of the foregoing rotational operations.

Thus, the wheel unit 5 is capable of traveling on a floor surface in all directions.

In this case, the relationship between the traveling velocity of the wheel unit 5 and the rotational velocities of the rotating members 27R, 27L (or the rotational velocities of the output shafts of the electric motors 31R, 31L) will be a certain correlation. To be specific, the traveling velocity of the wheel unit 5 in the longitudinal direction will be a velocity that is substantially proportional to the sum of the rotational velocities of the rotating members 27R, 27L, and the traveling velocity of the wheel unit 5 in the lateral direction will be a velocity that is substantially proportional to the difference between the rotational velocities of the rotating members 27R, 27L.

Therefore, in the vehicle 1 of the present embodiment, the power transmission system between the electric motors 31R, 31L and the wheel unit 5 is configured such that the driving force for moving the wheel unit 5 in the longitudinal direction is generated according to the total sum of the output torques (output torques including directions) of the electric motors 31R, 31L, and the driving force for moving the wheel unit 5 in the lateral direction is generated according to the difference between the output torques (output torques including directions) of the electric motors 31R, 31L.

The power transmission system can be also configured such that the driving force for moving the wheel unit 5 in the longitudinal direction is generated according to the difference between the output torques of the electric motors 31R, 31L and the driving force for moving the wheel unit 5 in the lateral direction is generated according to the total sum of the output torques of the electric motors 31R. 31L.

In the operation for moving the wheel unit 5 as described above, the traveling velocity and the traveling direction of the wheel unit 5 can be controlled by controlling the rotational velocities (including the rotational directions) of the electric motors 31R, 31L, consequently controlling the rotational velocities of the rotating members 27R, 27L.

Further, the mounting section 3 and the base body 9 are integrally tiltable with respect to the vertical direction about the axial center C2 in the lateral direction (in a pitch direction), using the axial center C2 of the wheel unit 5 as the supporting point, and also tiltable together with the wheel unit 5 with respect to the vertical direction about an axis in the longitudinal direction, i.e. in a rolling direction, using a ground contact portion (lower end portion) of the wheel unit 5 as the supporting point.

A description will now be given of the configuration related to the control of the operation of the vehicle 1.

Figure 5:
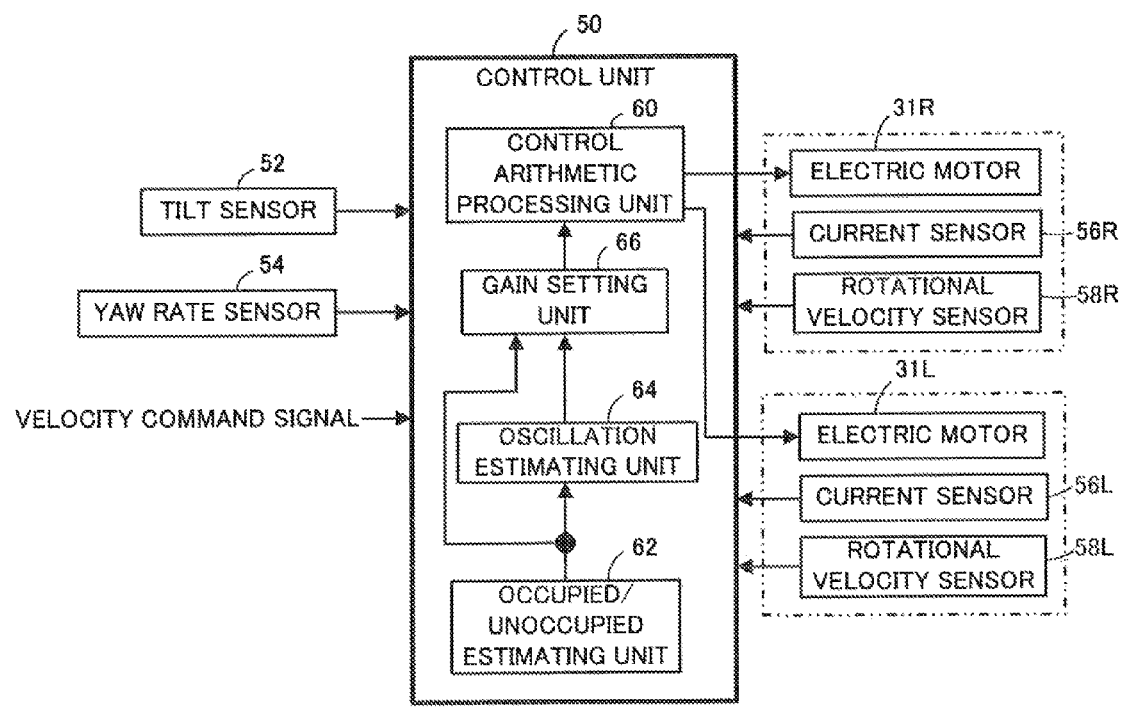
FIG. 5 is a block diagram illustrating a configuration related to the control of the inverted pendulum type vehicle according to the embodiment.

As illustrated in FIG. 5, the vehicle 1 is provided with a control unit 50 that controls the operations of the electric motors 31R, 31L thereby to control the travel of the wheel unit 5, a tilt sensor 52 that outputs detection signals based on the states of the tilt of the mounting section 3 in the roll direction and the pitch direction (specifically, the tilt angles in the roll direction and the pitch direction and the temporal change rates thereof (inclination angular velocities)), and a yaw rate sensor 54 that outputs detection signals based on the angular velocities in a yaw direction of the base body 9 of the vehicle 1. Further, the detection signals of the sensors 52 and 54 are input to the control unit 50.

The tilt sensor 52 is composed of, for example, an acceleration sensor and an angular velocity sensor, such as a gyro sensor. The tilt sensor 52 is mounted on a portion that can be tilted integrally with the mounting section 3 of the vehicle 1 (e.g. the support frame 13 of the base body 9, or the seat frame 15).

Further, in the control unit 50, the tilt angles in the roll direction and the pitch direction of the mounting section 3 and the observation value (estimated value) of the inclination angular velocities are acquired from a detection signal of the tilt sensor 52. In this case, the processing of estimating the tilt angles and the inclination angular velocities of the mounting section 3 from the detection signal of the tilt sensor 52 can be carried out by a publicly known technique, such as the strap-down calculation.

The yaw rate sensor 54 is constituted of an angular velocity sensor, such as a gyro sensor. The yaw rate sensor 54 is mounted on a portion, such as the support frame 13 of the base body 9, which permits the detection of the rate of yaw taking place in the base body 9 of the vehicle 1. The observation value (detection value) of the yaw rate of the base body 9 is acquired in the control unit 50 from the detection signal of the yaw rate sensor 54.

The yaw rate sensor 54 may be included in the tilt sensor 52 as a constituent element of the tilt sensor 52.

Further, the electric motors 31R, 31L are provided with current sensors 56R, 56L, which output detection signals based on the energizing currents of the electric motors 31R, 31L, and rotational velocity sensors 58R, 58L, which output detection signals based on the rotational velocities of the output shafts of the electric motors 31R, 31L. The rotational velocity sensors 58R, 58L are constituted of rotary encoders or the like mounted on, for example, the electric motors 31R, 31L, respectively.

The detection signals of the sensors 56R, 56L and 58R, 58L are also input to the control unit 50. In the control unit 50, the observation values (measurement values) of the energizing currents of the electric motors 31R, 31L are acquired from the detection signals of the current sensors 56R, 56L. Further, in the control unit 50, the observation values (measurement values) of the rotational velocities of the output shafts of the electric motors 31R, 31L or the observation values (measurement values) of the rotational velocities of the rotating members 27R. 27L are acquired from the detection signals of the rotational velocity sensors 58R, 58L.

The traveling velocity of the wheel unit 5 is specified according to the rotational velocities of the output shafts of the electric motors 31R, 31L. Therefore, the observation value (estimated value) of the traveling velocity of the wheel unit 5 can be acquired from the observation values (measurement values) of the rotational velocities of the output shafts of the electric motors 31R, 31L.

Further, in the present embodiment, a velocity command signal indicating a velocity command value, which is a command value of the traveling velocity (including the direction) of the vehicle 1, is input to the control unit 50 from a wired or wireless operation device (not illustrated).

The operation device may be one (e.g. a joystick) attached to an appropriate portion of the vehicle 1, such as the grip 17R or 17L, or may be a portable one, such as a wireless remote control or a smartphone.

The control unit 50 is constituted of an electronic circuit unit that includes a CPU, a RAM, a ROM, an input/output circuit and the like. Alternatively, the control unit 50 may be constituted of a plurality of electronic circuit units capable of communicating with each other.

The control unit 50 is mounted on an arbitrary appropriate location, such as the support frame 13 of the base body 9, of the vehicle 1. Further, the control unit 50 is provided with, as functions implemented by executing installed programs or implemented by a hardware configuration, a control arithmetic processing unit 60 that sequentially determines a desired traveling velocity of the wheel unit 5 to control the operations of the electric motors 31R, 31L, an occupied/unoccupied estimating unit 62 that estimates whether or not a rider is on the vehicle 1, an oscillation estimating unit 64 that estimates whether or not the oscillation phenomenon of the vehicle 1 has occurred due to the control by the control arithmetic processing unit 60, and a gain setting unit 66 that variably sets a gain value (the value of a feedback gain) used for the control calculation by the control arithmetic processing unit 60 by using the estimation results of the occupied/unoccupied estimating unit 62 and the oscillation estimating unit 64.

Supplementarily, the control unit 50, the occupied/unoccupied estimating unit 62, and the oscillation estimating unit 64 correspond to the control unit, the first estimating unit, and the second estimating unit, respectively, in the present invention.

The following will describe the operation of the vehicle 1 according to the present embodiment, an emphasis being placed on the details of the control processing by the control unit 50.

In the following description, an XYZ orthogonal coordinate system will be assumed, and the longitudinal direction of the vehicle 1 will be defined as an X-axis direction, the lateral direction will be defined as a Y-axis direction, and the vertical direction will be defined as a Z-axis direction, as illustrated in FIG. 1 and FIG. 2.

Further, a suffix "_x" will be attached to reference numerals, such as the state quantities related to the behavior of the vehicle 1 observed from the Y-axis direction (observed by projection onto an XZ plane), and a suffix "_y" will be attached to reference numerals, such as the state quantities related to the behavior of the vehicle 1 observed from the X-axis direction (observed by projection onto a YZ plane).

In this case, the reference numerals with the suffix "_x" attached thereto specifically include a displacement, a traveling velocity and acceleration in the X-axis direction or an angle and an angular velocity in the direction about the Y-axis (the pitch direction), or reference numerals denoting coefficients, constants or the like associated with the state quantities.

Further, the reference numerals with the suffix "_y" attached thereto specifically include a displacement, a traveling velocity and acceleration in the Y-axis direction or an angle and an angular velocity in the direction about the X-axis (the roll direction), or reference numerals denoting coefficients, constants or the like associated with the state quantities.

Further, a suffix "_#" will be used as a symbol that denotes either the suffix "_x" of the reference numerals associated with the behaviors of the vehicle 1 observed from the Y-axis direction or the suffix "_y" of the reference numerals associated with the behaviors of the vehicle 1 observed from the X-axis direction. Thus, "#" means either "x" or "y."

Figure 6:
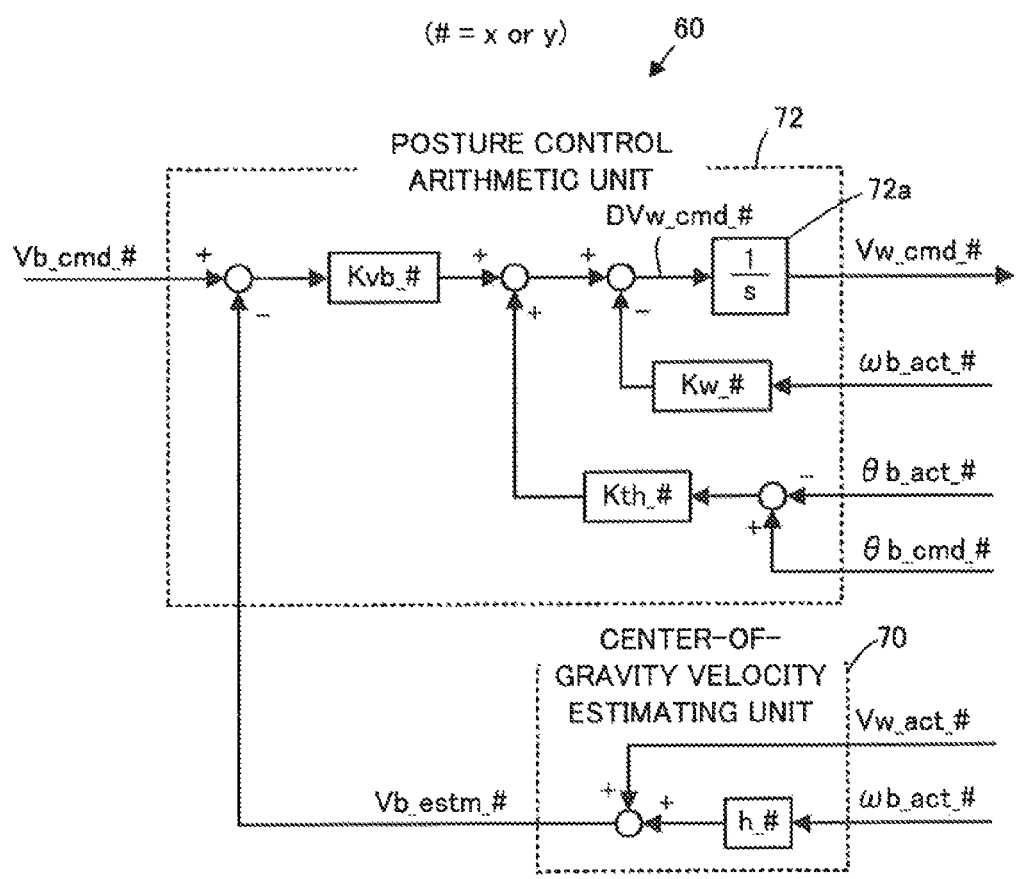
FIG. 6 is a block diagram illustrating the processing by a control arithmetic processing unit illustrated in FIG. 5.

First, the processing by the control arithmetic processing unit 60 will be described. The control arithmetic processing unit 60 sequentially carries out, at predetermined control processing cycles, the processing illustrated by the block diagram of FIG. 6 to control the behavior of the vehicle 1 observed from each of the Y-axis direction and the X-axis direction. In FIG. 6, the symbol "#" in the reference numerals denotes "x" in the processing for the control of the behavior of the vehicle 1 observed from the Y-axis direction, and denotes "y" in the processing for the control of the behavior of the vehicle 1 observed from the X-axis direction. The same applies to other drawings.

The processing illustrated by the block diagram of FIG. 6 is roughly divided into the processing by a center-of-gravity velocity estimating unit 70 that sequentially calculates an estimated value Vb_estm_# of the translational traveling velocity of the overall center of gravity (hereinafter referred to as "the center-of-gravity velocity") of the vehicle 1 in each of the X-axis direction and the Y-axis direction, and the processing by a posture control arithmetic unit 72 that sequentially determines a desired wheel unit velocity Vw_cmd_#, which is a desired value of the translational traveling velocity of the wheel unit 5 (hereinafter referred to as "the wheel unit velocity") so as to control the posture of the mounting section 3.

The foregoing overall center of gravity means the overall center of gravity combining the vehicle 1 and a rider in a state in which a rider is on the vehicle 1. In a state in which a rider is not on the vehicle 1, the foregoing overall center of gravity means the overall center of gravity of the vehicle 1 alone.

Further, the estimated value of the center-of-gravity velocity Vb_estm_# corresponds to the observation value of the center-of-gravity velocity.

The control arithmetic processing unit 60 first carries out the processing by the center-of-gravity velocity estimating unit 70 at each control processing cycle.

In this processing, the control arithmetic processing unit 60 acquires the observation value (current value) of an actual wheel unit velocity Vw_act_# and the observation value (current value) of an actual inclination angular velocity ωb_act_# of the mounting section 3.

In this case, the observation value of the inclination angular velocity ωb_act_# is a measurement value based on a detection signal of the tilt sensor 52.

Further, the observation value (current value) of the wheel unit velocity Vw_act_# in the present embodiment uses the desired wheel unit velocity Vw_cmd_# (previous value) determined by the posture control arithmetic unit 72 at a previous control processing cycle. The electric motors 31R, 31L have high control responsiveness, so that the actual wheel unit velocity Vw_act_# in general closely follows the desired wheel unit velocity Vw_cmd_#. Hence, the desired wheel unit velocity Vw_cmd#, which corresponds to a quasi-estimated value, can be used as the observation value of the wheel unit velocity Vw_act_#.

However, the observation value of Vw_act_# used for the processing by the center-of-gravity velocity estimating unit 70 may be an estimated value based on a measurement value of other calculated value associated with Vw_act_#. For example, the values of Vw_act_x and Vw_act_y estimated on the basis of the detection signals of the rotational velocity sensors 58R, 58L may be used as the observation values of Vw_act_# used for the processing by the center-of-gravity velocity estimating unit 70.

In the processing by the center-of-gravity velocity estimating unit 70, an estimated value Vb_estm_# of the center-of-gravity velocity in each of the X-axis direction and the Y-axis direction is calculated by the arithmetic processing illustrated by the block diagram of FIG. 6 from the observation value (current value) of the wheel unit velocity Vw_act_# and the observation value (current value) of the inclination angular velocity ωb_act_#, which are acquired as described above.

More specifically, the estimated values of the center-of-gravity velocities Vb_estm_x and Vb_estm_y are calculated according to expressions (1a) and (1b) given below.

$$Vb\_estm\_x = Vw\_act\_x + h\_x \cdot \omega b\_act\_x \quad (1a)$$

$$Vb\_estm\_y = Vw\_act\_y + h\_y \cdot \omega b\_act\_y \quad (1b)$$

In the vehicle 1 according to the present embodiment, as the mounting section 3 and the base body 9 tilt as described above, the overall center of gravity of the vehicle 1 exhibits the same behavior as that of the mass point of an inverted pendulum. Expressions (1a) and (1b) given above denote the behavior of the overall center of gravity (the behavior observed from each of the X-axis direction and the Y-axis direction) as the behavior of the mass point of the inverted pendulum.

In this case, "h_#" in expressions (1a) and (1b) corresponds to the height of the overall center of gravity as the mass point of the inverted pendulum from a supporting point. The values of the heights h_x and h_y in the present embodiment are predetermined values (fixed values) set beforehand. The heights h_x and h_y may be set to take different values depending on whether the vehicle 1 is occupied or unoccupied.

The control arithmetic processing unit 60 then determines a desired wheel unit velocity Vw_cmd_# (#=x or y) by the processing carried out by the posture control arithmetic unit 72, which processing is illustrated by the block diagram of FIG. 6.

In this processing, the control arithmetic processing unit 60 acquires the estimated value Vb_estm_# (current value) of the center-of-gravity velocity calculated by the processing carried out by the center-of-gravity velocity estimating unit 70, the value (current value) of the desired center-of-gravity velocity Vb_cmd_#, which is the desired value of the center-of-gravity velocity, the observation value (current value) of an actual tilt angle θb_act_# of the mounting section 3, the value (current value) of a desired tilt angle θb_cmd_#, which is the desired value of the tilt angle of the mounting section 3, and the observation value (current value) of the actual inclination angular velocity ωb_act_# of the mounting section 3.

In this case, the observation values of the tilt angle θb_act_# and the inclination angular velocity ωb_act_# are measurement values based on the detection signals of the tilt sensor 52.

In the present embodiment, the tilt angle θb_act_# of the mounting section 3 is a relative tilt angle, which uses, as the reference (zero tilt angle) thereof, the tilt angle of the mounting section 3 set beforehand in a state in which the overall center of gravity is positioned right above or substantially right above the ground contact portion of the wheel unit 5 (in a state in which the overall center of gravity corresponding to the mass point of the inverted pendulum is balanced). Further, the value of the desired tilt angle θb_cmd_# is set to zero (fixed value) in the present embodiment.

Further, the desired center-of-gravity velocity Vb_cmd_# is determined by the control unit 50 according to the foregoing velocity command signal or the like input to the control unit 50. For example, the velocity command value in each of the X-axis direction and the Y-axis direction indicated by a velocity command signal is determined as the desired center-of-gravity velocity Vb_cmd_#.

Alternatively, in the state in which a rider is on the mounting section 3, the quantity of deviation of the overall center of gravity caused by the motion of the upper body of the rider (the quantity of displacement of the overall center of gravity from a reference position relative to the mounting section 3) is estimated by, for example, the technique disclosed by the present applicant in Japanese Patent Application Laid-Open No. 2013-237335, and the desired center-of-gravity velocity Vb_cmd may be determined on the basis of the quantity of deviation.

In this case, as disclosed in Japanese Patent Application Laid-Open No. 2013-237335 and the like, the desired value of the center-of-gravity velocity determined on the basis of the quantity of deviation of the overall center of gravity and the desired value of the center-of-gravity velocity based on the foregoing velocity command signal may be combined to determine the desired center-of-gravity velocity Vb_cmd_#.

Further, as disclosed in Japanese Patent Application Laid-Open No. 2013-237335 or the like, the desired center-of-gravity velocity Vb_cmd_# or the desired tilt angle θb_cmd_# may be corrected according to the quantity of deviation of the overall center of gravity.

A variety of methods may be adopted for determining the desired center-of-gravity velocity V_cmd rather than being limited to the method described above.

In the processing by the posture control arithmetic unit 72, a desired wheel unit acceleration DVw_cmd_#, which is a desired value of the translational acceleration of the wheel unit 5 in each of the X-axis direction and the Y-axis direction, is calculated by the processing illustrated by the block diagram of FIG. 6 on the basis of the estimated value of the center-of-gravity velocity Vb_estm_# (current value), the value (current value) of the desired center-of-gravity velocity Vb_cmd_#, the value (current value) of the tilt angle θb_act_#, the value (current value) of the desired tilt angle θb_cmd_#, and the value (current value) of the inclination angular velocity ωb_act_#, which are acquired as described above.

More specifically, the desired wheel unit accelerations DVw_cmd_x and DVw_cmd_y are calculated according to expressions (2a) and (2b) given below.

$$DVw\_cmd\_x = Kvd\_x \cdot (Vb\_cmb\_x - Vb\_estm\_x) + \\ Kth\_x \cdot (\theta b\_cmd\_x - \theta b\_act\_x) - Kw\_x \cdot \omega b\_act\_x \quad (2a)$$

$$DVw\_cmd\_y = Kvd\_y \cdot (Vb\_cmb\_y - Vb\_estm\_y) + \\ Kth\_y \cdot (\theta b\_cmd\_y - \theta b\_act\_y) - Kw\_y \cdot \omega b\_act\_y \quad (2b)$$

Kvb_#, Kth_#, and Kw_# (#=x or y), which are necessary for the calculations of expressions (2a) and (2b) given above, denote gain values determined by the gain setting unit 66, as will be discussed hereinafter.

The first term of the right side of expression (2a) given above denotes a feedback manipulated variable component, which functions to converge the estimated value Vb_estm_x of the center-of-gravity velocity in the X-axis direction to the desired center-of-gravity velocity Vb_cmd_x, the second term thereof denotes a feedback manipulated variable component, which functions to converge the actual tilt angle θb_act_x in the direction about the Y-axis of the mounting section 3 to the desired tilt angle θb_cmd_x, and the third term denotes a feedback manipulated variable component, which functions to converge the actual inclination angular velocity ωb_act_x in the direction about the Y-axis of the mounting section 3 to zero, which is the desired value thereof. Hence, the desired wheel unit acceleration DVw_cmd_x in the X-axis direction is calculated as a compound manipulated variable of the feedback manipulated variable component.

Similarly, the first term of the right side of expression (2b) denotes a feedback manipulated variable component, which functions to converge the estimated value Vb_estm_y of the center-of-gravity velocity in the Y-axis direction to the desired center-of-gravity velocity Vb_cmd_y, the second term thereof denotes a feedback manipulated variable component, which functions to converge the actual tilt angle θb_act_y in the direction about the X-axis of the mounting section 3 to the desired tilt angle θb_cmd_y, and the third term denotes a feedback manipulated variable component, which functions to converge the actual inclination angular velocity ωb_act_y in the direction about the X-axis of the mounting section 3 to zero, which is the desired value thereof. Hence, the desired wheel unit acceleration DVw_cmd_y in the Y-axis direction is calculated as a compound manipulated variable of the feedback manipulated variable components.

In other words, the feedback manipulated variables of the second terms or the compound manipulated variables of the feedback manipulated variables of the second terms and the feedback manipulated variables of the third terms in expressions (2a) and (2b) are feedback manipulated variables, which function to converge the tilt angles θb_act_x and ωb_act_y of the mounting section 3 to tilt angles that place the overall center of gravity at the position right above or substantially right above the ground contact portion of the wheel unit 5.

In the processing by the posture control arithmetic unit 72, the desired wheel unit acceleration DVw_cmd_# is calculated as described above, and then the desired wheel unit acceleration DVw_cmd_# in each of the X-axis direction and the Y-axis direction is integrated by an integration arithmetic unit 72a illustrated in the block diagram of FIG. 6 thereby to determine the desired wheel unit velocity Vw_cmd_# in each of the X-axis direction and the Y-axis direction.

The processing by the posture control arithmetic unit 72 is carried out as described above.

The control arithmetic processing unit 60 controls the electric motors 31R, 31L according to the desired wheel unit velocity Vw_cmd_# determined as described above. More specifically, the control arithmetic processing unit 60 determines the desired torques of the electric motors 31R. 31L by feedback control processing so as to cause the observation values (measurement values) of the actual rotational velocities indicated by the detection signals of the rotational velocity sensors 58R, 58L to follow the desired values of the rotational velocities of the output shafts of the electric motors 31R, 3 IL specified by a pair of the desired wheel unit velocities Vw_cmd_x, Vw_cmd_y.

Then, the control arithmetic processing unit 60 converts the desired torques of the electric motors 31R, 31L to current command values I_cmd_R, I_cmd_L of the electric motors 31R, 31L. The electric motors 31R, 31L are energized according to the current command values I_cmd_R, I_cmd_L.

By the processing carried out by the control arithmetic processing unit 60 described above, the driving force supplied from the electric motors 31R, 31L to the wheel unit 5 is controlled such that the actual wheel unit velocity Vw_act_# in each of the X-axis direction and the Y-axis direction follows the desired wheel unit velocity Vw_cmd_#.

The processing by the control arithmetic processing unit 60 described above is carried out in the same manner regardless of whether or not a rider is on the vehicle 1.

A description will now be given of the processing carried out by the occupied/unoccupied estimating unit 62, the oscillation estimating unit 64, and the gain setting unit 66.

First, the processing by the occupied/unoccupied estimating unit 62 will be described with reference to FIG. 7 and FIG. 8.

The frictional force acting on the wheel unit 5 of the vehicle 1 from a floor surface differs between the state in which a rider is on the vehicle 1 (hereinafter referred to as "the occupied state") and the state in which a rider is not on the vehicle 1 (hereinafter referred to as "the unoccupied state"). Hence, the driving force of the wheel unit 5 necessary for operating the vehicle 1 into a required state differs between the occupied state and the unoccupied state.

The occupied state means a state in which the gravity by the weight of the rider is acting on the vehicle 1 and does not necessarily mean that the rider is riding or sitting on the mounting section 3 at a regular position and posture. For example, the occupied state includes a state in which the rider rests his or her feet of both legs on the steps 25R, 25L but his or her waist is lifted above the mounting section 3.

The driving force (output torque) output from the electric motors 31R. 31L and thus the driving force (propulsion force) imparted from the electric motors 31R, 31L to the wheel unit 5 will be based on the energizing currents of the electric motors 31R, 31L.

Therefore, the occupied/unoccupied estimating unit 62 estimates whether the vehicle 1 is occupied or unoccupied according to the energizing currents (the command values and observation values) of the electric motors 31R, 31L.

Figure 7:
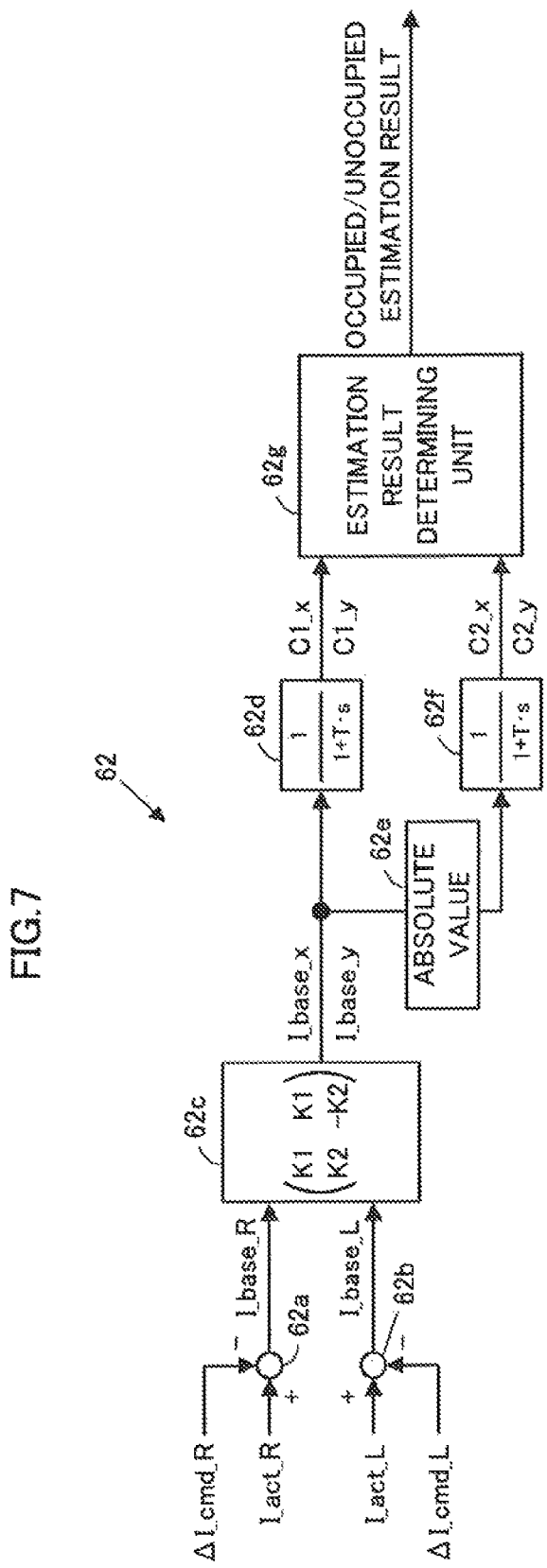
FIG. 7 is a block diagram illustrating the processing by an occupied/unoccupied estimating unit illustrated in FIG. 5.

To be specific, the occupied/unoccupied estimating unit 62 sequentially carries out the processing illustrated by the block diagram of FIG. 7 at predetermined control processing cycles.

In this processing, the occupied/unoccupied estimating unit 62 first acquires current observation values I_act_R, I_act_L, which are the observation values (measurement values) of the energizing currents of the electric motors 31R, 31L that are indicated by the detection signals of the current sensors 56R, 56L, and acceleration/deceleration current components ΔI_cmd_R, ΔI_cmd_L corresponding to the amounts of changes of the current command values I_cmd_R, I_cmd_L calculated in a situation in which the control arithmetic processing unit 60 is attempting to increase or decrease the desired output torque of each of the electric motors 31R. 31L.

The acceleration/deceleration current components ΔI_cmd_R, ΔI_cmd_L are calculated according to, for example, expressions (3a) and (3b) given below.

$$\Delta I\_cmd\_R = Jm\_R \cdot \alpha\_cmd\_R / Kt\_R \quad (3a)$$

$$\Delta I\_cmd\_L = Jm\_L \cdot \alpha\_cmd\_L / Kt\_L \quad (3b)$$

Jm_R in expression (3a) related to the electric motor 31R denotes a set value of an inertial moment related to the rotation of the output shaft of the electric motor 31R, α_cmd_R denotes the command value of the rotational angular acceleration of the output shaft of the electric motor 31R (a command value determined to cause the observation value of the actual rotational velocity of the output shaft of the electric motor 31R to follow a desired rotational velocity), and Kr_R denotes a torque constant indicating the value of torque per unit current of the electric motor 31R.

The same applies to Jm_L, α_cmd_L, and Kt_L in expression (3b) related to the electric motor 31L.

Accordingly, each of the acceleration/deceleration current components ΔI_cmd_R, ΔI_cmd_L denotes, in other words, the energizing current value necessary for generating desired acceleration or deceleration of the output shaft of each of the electric motors 31R, 31L.

Further, the occupied/unoccupied estimating unit 62 carries out the processing by arithmetic units 62a, 62b. In this processing, the occupied/unoccupied estimating unit 62 calculates a current value I_base_R obtained by subtracting the acceleration/deceleration current component AI cmd_R from the current observation value I_act_R of the electric motor 31R (=I_act_R−ΔI_cmd_R), and a current value ΔI_base_L obtained by subtracting the acceleration/deceleration current component ΔI_cmd_L from the current observation value I_act_L of the electric motor 31L (=I_act_L−ΔI_cmd_L).

Thus, the current values I_base_R, I_base_L, which are the results of removing transient fluctuation components from the current observation values I_act_R, I_act_L, are determined. The current values I_base_R, I_base_L correspond to the reference current values in the present invention. Hereinafter, I_base_R, I_base_L will be referred to as the reference current values.

The occupied/unoccupied estimating unit 62 then carries out the processing by a conversion processing unit 62c. In this processing, the occupied/unoccupied estimating unit 62 calculates, from the reference current values I_base_R, I_base_L, an X-axis direction reference current value I_base_x, which functions to generate a driving force for moving the wheel unit 5 in the X-axis direction (longitudinal direction), and a Y-axis direction reference current value I_base_y, which functions to generate a driving force for moving the wheel unit 5 in the Y-axis direction (lateral direction).

In the vehicle 1 according to the present embodiment, as described above, the driving force for moving the wheel unit 5 in the X-axis direction (longitudinal direction) is based on the total sum of the output torques of the electric motors 31R, 31L. Further, the driving force for moving the wheel unit 5 in the Y-axis direction (lateral direction) is based on the difference in the output torque between the electric motors 31R, 31L.

Further, regarding the driving forces (output torques) output from the electric motors 31R, 31L, the efficiency of conversion into the driving force for the wheel unit 5 differs between the efficiency of conversion into the driving force for moving the wheel unit 5 in the X-axis direction (longitudinal direction) and the efficiency of conversion into the driving force for moving the wheel unit 5 in the Y-axis direction (lateral direction), the conversion efficiency of the latter being lower than the conversion efficiency of the former in the present embodiment.

In the present embodiment, therefore, the conversion processing unit 62c converts the reference current values I_base_R, I_base_L into a pair of the X-axis direction reference current value I_base_x and the Y-axis direction reference current value I_base_y according to expressions (5a) and (5b) given below.

The X-axis direction and the Y-axis direction correspond to the first direction and the second direction, respectively, in the present invention. Further, the X-axis direction reference current value I_base_x and the Y-axis direction reference current value I_base_y correspond to the first direction reference current value and the second direction reference current value, respectively, in the present invention.

$$I\_base\_x = K1*(I\_base\_R + I\_base\_L) \quad (5a)$$

$$I\_base\_y = K2*(I\_base\_R - I\_base\_L) \quad (5b)$$

Regarding the polarities of I_base_R and I_base_L in expressions (5a) and (5b), the current values in the same direction as that of the energizing currents of the electric motors 31R, 31L in a situation, in which output torques in a direction fir causing the wheel unit 5 to advance in the X-axis direction are being generated by the electric motors 31R, 31L, are defined to have the positive polarity.

K1 in expression (5a) denotes a positive coefficient value set beforehand, and K2 in expression (5b) denotes a positive coefficient value set beforehand. In the vehicle 1 according to the present embodiment, the relationship between these positive coefficient values is indicated by K1>K2.

Supplementarily, I_base_R=I_act_R−ΔI_cmd_R and I_base_L=I_act_L−ΔI_cmd_L, so that expressions (5a), (5b) given above can be rewritten to expressions (5a'), (5b') given below.

$$I\_base\_x = \\ K1*(I\_act\_R + I\_act\_L) - K1*(\Delta I\_cmd\_R + \Delta I\_cmd\_L) \quad (5a')$$

$$I\_base\_y = \\ K2*(I\_act\_R - I\_act\_L) - K2*(\Delta I\_cmd\_R - \Delta I\_cmd\_L) \quad (5b')$$

The current component in the X-axis direction in the case where a pair of I_act_R and I_act_L is converted into a pair of a current component in the X-axis direction and a current component in the Y-axis direction is denoted by the first term (=K1*(I_act_R+I_act_L)) of the right side of expression (5a'), and a current component in the Y-axis direction is denoted by the first term (K2*(I_act_R−I_act_L)) of the right side of expression (5b').

Further, the component in the X-axis direction in the case where a pair of ΔI_cmd_R and ΔI_cmd_L is converted into a pair of a current component in the X-axis direction and a current component in the Y-axis direction is denoted by the second term (=K1*(ΔI_cmd_R+ΔI_cmd_L)) of the right side of expression (5a'), and a current component in the Y-axis direction is denoted by the second term (=K2*(ΔI_cmd_R−ΔI_cmd_L)) of the right side of expression (5b').

Accordingly, the pair of I_act_R and I_act_L and the pair of ΔI_cmd_R and ΔI_cmd_L may be separately converted into the current components in the X-axis direction and the current components in the Y-axis direction, and then the current component in each axial direction corresponding to the pair of ΔI_cmd_R and ΔI_cmd_L may be subtracted from the current component in each axial direction corresponding to the pair of I_act_R and I_act_L thereby to calculate the X-axis direction reference current value I_base_x and the Y-axis direction reference current value I_base_y.

In this case, the current component in the X-axis direction and the current component in the Y-axis direction corresponding to the pair of I_act_R and I_act_L correspond to the first direction current value and the second direction current value, respectively, in the present invention. Further, the current component in the X-axis direction and the current component in the Y-axis direction corresponding to the pair of ΔI_cmd_R and ΔI_cmd_L correspond to the first direction acceleration/deceleration current value and the second direction acceleration/deceleration current value, respectively, in the present invention.

Then, the occupied/unoccupied estimating unit 62 passes the X-axis direction reference current value I_base_x and the Y-axis direction reference current value I_base_y through a filter 62d having a low-pass characteristic so as to determine first reference values C1_x and C1_y in the X-axis direction and the Y-axis direction, respectively. Thus, the first reference values C1_x and C1_j are determined by smoothing I_base_x and I_base_y, respectively. The filter 62d is a filter having the transfer function thereof denoted by, for example, 1/(1+T·s).

Further, the occupied/unoccupied estimating unit 62 calculates, by an arithmetic unit 62e, the absolute values of I_base_x and I_base_y as the values that indicate the magnitudes of the X-axis direction reference current value I_base_x and the Y-axis direction reference current value I_base_y, respectively.

The values indicating the magnitudes of I_base_x and I_base_y may be index values in place of absolute values. For example, square values of I_base_x and I_base_y may be used as the values indicating the magnitudes of the I_base_x and I_base_y.

Then, the occupied/unoccupied estimating unit 62 passes the values indicating the magnitudes of I_base_x and I_base_y (the absolute values in the present embodiment) through a filter 62f having a low-pass characteristic so as to determine second reference values C2_x and C2_y in the X-axis direction and the Y-axis direction, respectively. Thus, the second reference values C2_x and C2_y are determined by smoothing the values indicating the magnitudes of I_base_x and I_base_y, respectively. As with the filter 62d, the filter 62f is a filter having the transfer function thereof denoted by, for example, 1/(1+T·s).

The first reference value C1_x and the second reference value C2_x in the X-axis direction correspond to the first a reference value and the first b reference value, respectively, in the present invention. Further, the first reference value C1_y and the second reference value C2_y in the Y-axis direction correspond to the second a reference value and the second b reference value, respectively, in the present invention.

Supplementarily, instead of using the filter 62*d* having a low-pass characteristic to determine the first reference values C1_x, C1_y, processing of averaging I_base_x and I_base_y (e.g. moving average processing) may be adopted to determine the first reference values C1_x, C1_y.

Similarly, instead of using the filter 62*f* having a low-pass characteristic to determine the second reference values C2_x, C2_y, processing of averaging the values indicating the magnitudes of I_base_x and I_base_y (e.g. absolute values or square values) may be adopted to determine the second reference values C2_x, C2_y. For example, the mean squares of I_base_x and I_base_y (mean values of square values of the values from predetermined time to current time) may be determined as the second reference values C2_x, C2_y.

The smoothing processing of determining the first reference values C1_x, C1_y and the smoothing processing of determining the second reference values C2_x, C2_y desirably use the same processing.

The occupied/unoccupied estimating unit 62 carries out processing of determining an occupied/unoccupied estimation result by an estimation result determining unit 62*g* by using the first reference values C1_x. C1_y and the second reference values C2_x, C2_y determined as described above.

Figure 8:
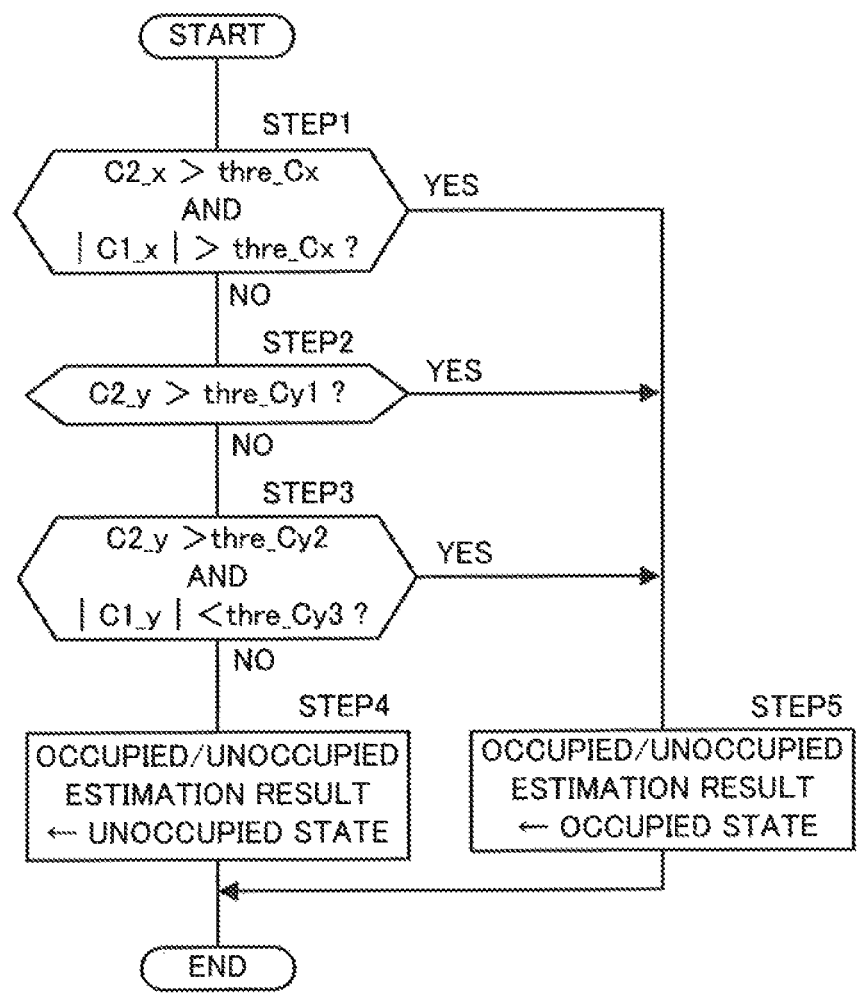
FIG. 8 is a flowchart illustrating the processing by an estimation result determining unit illustrated in FIG. 7.

The processing is carried out as illustrated by the flowchart of FIG. 8.

Specifically, the occupied/unoccupied estimating unit 62 determines in STEP1 whether or not a condition is satisfied in that the second reference value in the X-axis direction C2_x is larger than a predetermined positive threshold value thre_Cx and that an absolute value |C1_x|, which is a value indicating the magnitude of the first reference value in the X-axis direction C1_x is larger than the threshold value thre_Cx.

In a situation in which the vehicle 1 is occupied and the wheel unit 5 is continuously traveling with a relatively large traveling velocity component in the X-axis direction (hereinafter referred to as "the occupied and X-axis-direction traveling situation"), both C2_x and |C1_x| are generally relatively larger than those in a situation other than the occupied and X-axis-direction traveling situation.

Therefore, properly setting the threshold value thre_Cx according to experiments or the like causes the determination result in STEP1 to be affirmative in the occupied and X-axis-direction traveling situation and causes the determination result in STEP1 to be negative in a situation (including an unoccupied situation) other than the occupied and X-axis-direction traveling situation.

Hence, if the determination result in STEP1 is affirmative, then the occupied/unoccupied estimating unit 62 determines in STEP5 that the vehicle 1 is occupied as the result of estimation of whether the vehicle 1 is occupied or unoccupied (hereinafter referred to as "the occupied/unoccupied estimation result").

If the determination result in STEP1 is negative, then the occupied/unoccupied estimating unit 62 determines in STEP2 whether or not a condition is satisfied in that the second reference value in the Y-axis direction C2_y is larger than a predetermined positive threshold value thre_Cy1.

In the case where the determination result in STEP1 is negative, which is a situation other than the occupied and X-axis-direction traveling situation, if the vehicle 1 is occupied and the wheel unit 5 is continuously traveling with a relatively large traveling velocity component in the Y-axis direction (hereinafter referred to as "the occupied and Y-axis-direction traveling situation"), then C2_y will be relatively larger than in the situation other than the occupied and Y-axis-direction traveling situation.

Therefore, properly setting the threshold value thre_Cy1 according to experiments or the like causes the determination result in STEP2 to be affirmative in the occupied and Y-axis-direction traveling situation and causes the determination result in STEP2 to be negative in a situation other than the occupied and Y-axis-direction traveling situation.

Hence, if the determination result in STEP2 is affirmative, then the occupied/unoccupied estimating unit 62 determines "occupied" as the occupied/unoccupied estimation result in STEP5.

The determination processing in STEP1 and STEP2 described above makes it possible to properly estimate that the vehicle 1 is occupied in the case where the vehicle 1 is occupied and moving (traveling).

If the determination result in STEP2 is negative, then the occupied/unoccupied estimating unit 62 determines in STEP3 whether or not a condition is satisfied in that the second reference value in the Y-axis direction C2_y is larger than a predetermined positive threshold value thre_Cy2 and that an absolute value |C1_y|, which indicates the magnitude of the first reference value in the Y-axis direction C1_y is smaller than a predetermined positive threshold value thre_Cy3.

The threshold value thre_Cy2 in STEP3 is set to be a value that is smaller than the threshold value thre_Cy1 in STEP2. Further, the threshold value thre_Cy3 in the present embodiment is set according to the second reference value in the Y-axis direction C2_y. For example, a value obtained by multiplying C2_y by a positive proportional constant that is smaller than 1 (<C2_y) is set as the threshold value thre_Cy3.

A situation in which the determination results in STEP1 and STEP2 are negative, i.e. a situation that is neither the occupied and X-axis-direction traveling situation nor the occupied and Y-axis-direction traveling situation, is either a situation in which the vehicle 1 is occupied and the wheel unit 5 is in a travel stop state or close to a travel stop state (a state in which the wheel unit 5 is slightly moving in a vibrating manner at substantially the same spot) or a situation in which the vehicle 1 is unoccupied.

In the situation in which the vehicle 1 is occupied and the vehicle 1 is in the travel stop state or close thereto (hereinafter referred to "the occupied and travel stop situation"), the second reference value in the Y-axis direction C2_y is, in general, relatively larger than that in the situation in which the vehicle 1 is unoccupied, and the magnitude of the first reference value in the Y-axis direction C1_y is easily maintained to be smaller than the second reference value in the Y-axis direction C2_y.

In contrast thereto, in the situation in which the vehicle 1 is unoccupied, the second reference value in the Y-axis direction C2_y is maintained to a smaller value than in the case where the vehicle 1 is occupied, or it is more difficult for the magnitude of the first reference value in the Y-axis direction C1_y to become smaller than that of the second reference value in the Y-axis direction C2_y.

Accordingly, properly setting the threshold values thre_Cy2, thre_Cy3 according to experiments or the like causes the determination result in STEP3 to be affirmative in the occupied and travel stop situation and causes the determination result in STEP3 to be negative in a situation other than the occupied and travel stop situation (i.e. the unoccupied situation).

Hence, if the determination result in STEP3 is affirmative, then the occupied/unoccupied estimating unit 62 determines in STEP5 that the occupied/unoccupied estimation result is the occupied state. Further, if the determination result in STEP3 is negative, then the occupied/unoccupied estimating unit 62 determines in STEP4 that the occupied/unoccupied estimation result is the unoccupied state.

The above has described in detail the processing by the occupied/unoccupied estimating unit 62. Thus, if any one of the determination results in STEP1 to STEP3 is affirmative, then the occupied/unoccupied estimation result will be the occupied state. Further, if all the determination results of STEP1 to STEP3 are negative, then the occupied/unoccupied estimation result will be the unoccupied state.

The processing by the occupied/unoccupied estimating unit 62 makes it possible to properly estimate whether the vehicle 1 is occupied or unoccupied without providing the mounting section 3 with a load sensor or the like. Further, in this case, even in a state in which a rider is not sitting on the mounting section 3 at the regular position and posture (e.g. a state in which a rider's waist is lifted from the mounting section 3) in the occupied state, the occupied state can be correctly estimated as long as the gravity by the weight of the rider acts on the vehicle 1.

In STEP1, it may be determined merely whether or not the second reference current value in the X-axis direction C2_x is larger than the predetermined positive threshold value thre_Cx. Alternatively, it may be determined merely whether or not the absolute value |C1_x| of the first reference current value in the X-axis direction C1_x is larger than the threshold value thre_Cx. Further alternatively, it may be determined whether either a condition in that the second reference current value in the X-axis direction C2_x is larger than the predetermined positive threshold value thre_Cx or a condition in that the absolute value |C1_x| of the first reference current value in the X-axis direction C1_x is larger than the threshold value thre_Cx is satisfied.

Further, in the present embodiment, the absolute values have been used as the values indicating the magnitudes of the first reference values C1_x in the X-axis direction and C1_y in the Y-axis direction to estimate whether the vehicle 1 is occupied or unoccupied. Alternatively, however, the square value or the mean square (the mean value of the square values of the values from predetermined previous time to current time) of each of the first reference values C1_x and C1_y may be used. If the mean squares of the first reference values C1_x and C1_y are used, then the processing of averaging each of I_base_x and I_base_y is desirably carried out to determine the first reference values C1_x and C1_y.

Further, in the present embodiment, the pair of the current value I_base_R obtained by subtracting the acceleration/deceleration current component ΔI_cmd_R from the current observation value I_act_R of the electric motor 31R and the current value I_base_L obtained by subtracting the acceleration/deceleration current component ΔI_cmd_L from the current observation value I_act_L of the electric motor 31L has been converted into the pair of the X-axis direction reference current value I_base_x and the Y-axis direction reference current value I_base_y.

Alternatively however, the calculation of the acceleration/deceleration current components ΔI_cmd_R and ΔI_cmd_L may be omitted, and the pair of the X-axis direction reference current value I_base_x and the Y-axis direction reference current value I_base_y may be generated from the pair of the current observation value I_act_R of the electric motor 31R and the current observation value I_act_L of the electric motor 31L. More specifically, the X-axis direction reference current value I_base_x and the Y-axis direction reference current value I_base_v may be calculated according to expressions obtained by replacing I_base_R and I_base_L of the right sides in the foregoing expressions (5a) and (5b) by I_act_R and I_act_L.

Calculating I_base_x and I_base_y by using the acceleration/deceleration current components ΔI_cmd_R and ΔI_cmd_L as described above makes it possible to prevent transient fluctuation components from being included in I_base_x and I_base_y. For this reason, it is desirable to use the acceleration/deceleration current components ΔI_cmd_R and ΔI_cmd_L to further enhance the reliability of the result of estimation on whether the vehicle 1 is occupied or unoccupied.

The processing by the oscillation estimating unit 64 will now be described with reference to FIG. 9 and FIG. 10.

If the magnitudes of gain values Kvb_#, Kth_# and Kw_# (#=x or y) used in the processing by the posture control arithmetic unit 72 is excessive, then the vehicle 1 may develop an oscillation phenomenon in some cases. The oscillation phenomenon of the vehicle 1 is a phenomenon in which the oscillation of the traveling operation of the wheel unit 5 and the oscillation of the tilting operation of the mounting section 3 or the base body 9 take place in synchronization independently of the control by the rider.

If the oscillation phenomenon described above occurs, it is desirable to reduce the magnitudes of the gain values Kvb_#, Kth_# and Kw_#. The oscillation phenomenon of the vehicle 1 tends to occur more frequently when the vehicle 1 is unoccupied than when occupied.

Hence, the oscillation estimating unit 64 estimates whether or not the vehicle 1 has developed the oscillation phenomenon. In this case, the oscillation estimating unit 64 uses an occupied/unoccupied estimation result for the estimation processing.

Specifically, the oscillation estimating unit 64 sequentially carries out the processing illustrated by the block diagram of FIG. 9 at predetermined control processing cycles.

The oscillation estimating unit 64 carries out the processing on the behavior of the vehicle 1 observed from the Y-axis direction and on the behavior of the vehicle 1 observed from the X-axis direction in the same manner.

Hence, the reference characters with the suffix "#" are used in FIG. 9 and FIG. 10, as with the case of FIG. 6.

Referring to FIG. 9, the oscillation estimating unit 64 first acquires the current value (the value at a current control processing cycle) and a previous value (the value at a previous control processing cycle) of the observation value of an actual wheel unit velocity Vw_act_#, the observation value of a current inclination angular velocity ωb_act_# of the mounting section 3 based on a detection signal of the tilt sensor 52, and a current occupied/unoccupied determination result.

In this case, a current value and a previous value of a desired wheel unit velocity Vw_cmd_# calculated by the posture control arithmetic unit 72, for example, are used as the current value and the previous value of the observation value of the wheel unit velocity Vw_act_#. In this case, the current value and the previous value of the desired wheel unit velocity Vw_cmd_# mean quasi-estimated values of the current value and the previous value of the wheel unit velocity Vw_act_#.

Alternatively, however, a current value and a previous value of an estimated value of Vw_act_# based on the detection signals of the rotational velocity sensors 58R, 58L, for example, may be used as the current value and the previous value of the observation value of the wheel unit velocity Vw_act_# used in the processing by the oscillation estimating unit 64.

Further, the observation value of the inclination angular velocity ωb_act_# is a measurement value based on a detection signal of the tilt sensor 52.

Then, the oscillation estimating unit 64 carries out by an arithmetic unit 64a the processing of dividing the difference between the current value and the previous value (=the current value−the previous value) of the observation value of the wheel unit velocity Vw_act_# by time Ts of the control processing cycle. By this processing, the observation value (estimated value) of the actual translational acceleration DVw_act_#(hereinafter referred to as "the wheel unit acceleration DVw_act_#") of the wheel unit 5 is calculated.

Further, the observation value of the wheel unit acceleration DVw_act_# is passed through a filter 64b of high pass characteristics to acquire a high frequency side component hp_DVw_# of the wheel unit acceleration DVw_act_#.

In this case, the frequency pass characteristics of the filter 64b is set to pass frequency components that are higher than the natural frequency of the vehicle 1.

Further, the oscillation estimating unit 64 passes the observation value of the inclination angular velocity ωb_act_# through a filter 64c of high pass characteristics to acquire a high frequency side component hp_ωb_# of the inclination angular velocity ωb_act_#.

In this case, the frequency pass characteristics of the filter 64c are the same as those of the filter 64b for the wheel unit acceleration DVw_act_#. For example, the filters 64b and 64c in the illustrated example are constituted as filters having the transfer functions denoted by T·s/(1+T·s).

Subsequently, the oscillation estimating unit 64 multiplies, by an arithmetic unit 64d, the high frequency side component hp_DVw_# of the wheel unit acceleration DVw_act_# by the high frequency side component hp_bb_# of the inclination angular velocity ωb_act_# so as to calculate a basic correlation value osci_val_# of the high frequency components.

Then, the oscillation estimating unit 64 integrates, by an integration arithmetic unit 64e, the basic correlation value osci_val_# to generate a correlation reference value sum_val_# that denotes the degree of correlation between the high frequency side component hp_DVw_# of the wheel unit acceleration DVw_act_# and the high frequency side component hp_ωb_# of the inclination angular velocity ωb_act_#.

The integration by the integration arithmetic unit 64e in the present embodiment is a quasi-integration. More specifically, in the processing by the integration arithmetic unit 64e, a current value of the correlation reference value sum_val_# is calculated by adding a current value of the correlation value osci_val_# to the result obtained by multiplying a previous value of the correlation reference value sum_val_# by a positive constant value Kdec_# of 1 or less.

In the situation in which the oscillation phenomenon has occurred in the vehicle 1, the correlation value osci_val_# typically takes a relatively large value. Hence, in the situation in which the oscillation phenomenon has occurred in the vehicle 1, the correlation reference value sum_val_# output from the integration arithmetic unit 64e will increase.

In the present embodiment, the correlation reference value sum_val_# output from the integration arithmetic unit 64e is attenuated to zero by an attenuation processing unit (not illustrated) in a situation in which the occurrence of the oscillation phenomenon has been eliminated (in a situation in which the correlation reference value sum_val_# no longer increases).

Subsequently, the oscillation estimating unit 64 carries out, by an estimation result determining unit 64f, the processing of determining the result of the estimation on whether or not the vehicle 1 is in the oscillation state (hereinafter referred to as "the oscillation estimation result") by using the correlation reference value sum_val_# output from the integration arithmetic unit 54e and an estimation result of the occupied/unoccupied estimating unit 62.

The processing is carried out as illustrated by the flowchart of FIG. 10.

The oscillation estimating unit 64 first determines in STEP11 whether or not the occupied/unoccupied estimation result indicates the occupied state. Then, the oscillation estimating unit 64 sets the value of the threshold value thre_sum_#, which is to be compared with the correlation reference value sum_val_#, according to the determination result.

Specifically, if the determination result in STEP11 is affirmative (if the occupied/unoccupied estimation result indicates the occupied state), then the oscillation estimating unit 64 sets in STEP12 a predetermined value thre_sum_ride_#, which is determined in advance for the occupied state, as the value of the threshold value thre_sum_#.

Further, if the determination result in STEP11 is negative (if the occupied/unoccupied estimation result indicates the unoccupied state), then the oscillation estimating unit 64 sets in STEP13 a predetermined value thre_sum_self_#, which is determined in advance for the unoccupied state, as the value of the threshold value thre_sum_#.

The predetermined value for the unoccupied state thre_sum_self_# is set to a value that is smaller than the predetermined value for the occupied state thre_sum_ride_#. For example, these predetermined values are set to thre_sum_self_#=1 and thre_sum_ride_#=5.

Subsequently, in STEP14, the oscillation estimating unit 64 determines whether or not the correlation reference value sum_val_# is larger than the threshold value thre_sum_# set in STEP12 or STEP13.

If the determination result is affirmative, then the oscillation estimating unit 64 determines in STEP15 the oscillation estimation result as the oscillation state (the oscillation estimation result will be hereinafter referred to as "the oscillation present state").

If the determination result in STEP14 is negative, then the oscillation estimating unit 64 determines in STEP16 the oscillation estimation result as non-oscillation state (the oscillation estimation result will be hereinafter referred to as "the oscillation absent state").

The above has given the detailed description of the processing by the oscillation estimating unit 64 related to the behaviors of the vehicle 1 observed from each of the Y-axis direction and the X-axis direction.

The processing by the oscillation estimating unit 64 makes it possible to properly estimate whether or not the oscillation phenomenon has occurred by using the correlation reference value sum_val_# obtained by integrating the correlation value osci_val_#. Further, the threshold values thre_sum_x (=thre_sum_self_x) and thre_sum_y (=thre_sum_self_y) set in the unoccupied state are smaller than the threshold values thre_sum_x (=thre_sum_ride_x) and thre_sum_y (=thre_sum_ride_y), respectively, which are set in the occupied state. Hence, the oscillation estimation result will be determined as the oscillation present state early in the unoccupied state, in which the oscillation phenomenon is apt to occur.

The processing by the gain setting unit 66 will now be described with reference to FIG. 11 to FIG. 14.

In order to make it possible to properly control the travel of the wheel unit 5 in a variety of situations, the gain setting unit 66 variably sets the gain values Kvb_#, Kth_#, and Kw_# (#=x or y) used for the processing by the posture control arithmetic unit 72 according to the tilt state of the mounting section 3 (specifically, the states of the deviations of the tilt angle θb_act_# and the inclination angular velocity ωb_act_# from the desired values thereof), the occupied/unoccupied estimation result, and the oscillation estimation result.

Supplementarily, the desired wheel unit acceleration DVw_cmd_# is determined according to the foregoing expressions (2a) and (2b). Hence, the gain value Kvb_#, in other words, corresponds to the sensitivity of a change in the actual wheel unit acceleration DVw_act_# in response to a change in the estimated value (observation value) of the center-of-gravity velocity Vb_estm_#. Similarly, the gain value Kth_#, in other words, corresponds to the sensitivity of a change in the actual wheel unit acceleration DVw_act_# in response to a change in the tilt angle θb_act_# (observation value) of the mounting section 3. Further, the gain value Kw_#, in other words, corresponds to the sensitivity of a change in the actual wheel unit acceleration DVw_act_# in response to a change in the inclination angular velocity ωb_act_# (observation value) of the mounting section 3.

Figure 11:
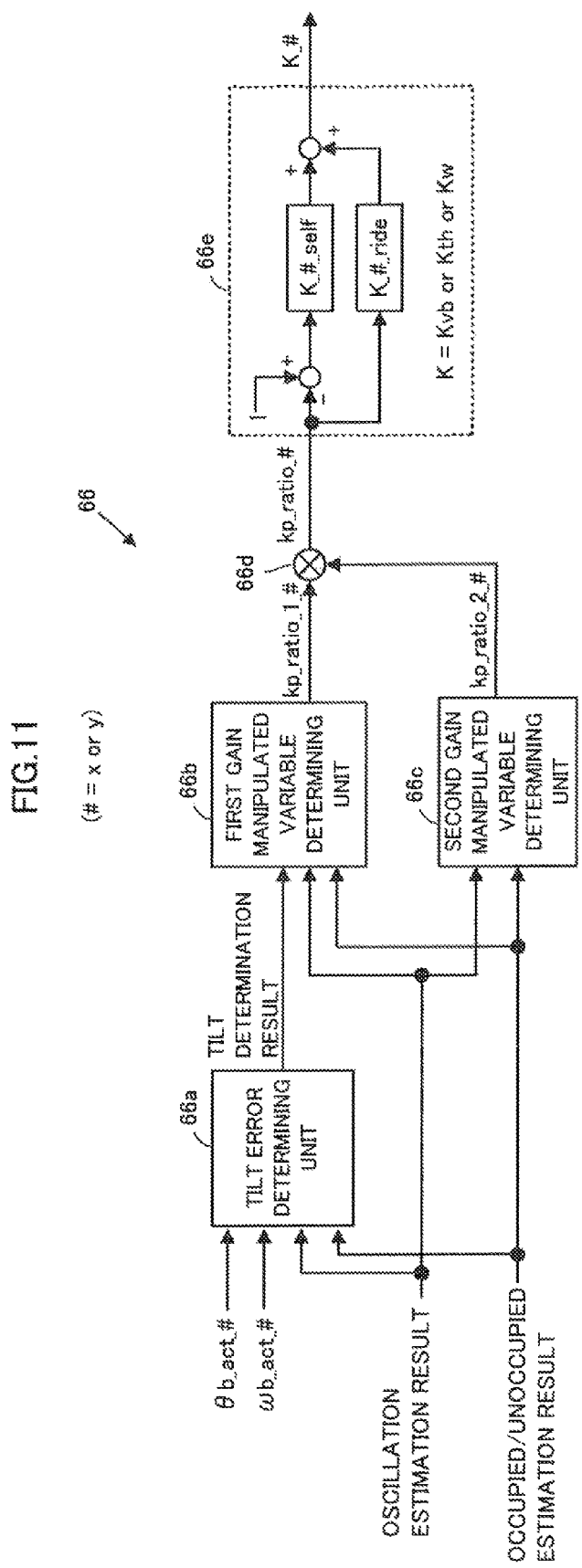
FIG. 11 is a block diagram illustrating the processing by a gain setting unit illustrated in FIG. 5.

Specifically, the gain setting unit 66 sequentially carries out the processing illustrated by the block diagram in FIG. 11 at predetermined control processing cycles.

The processing by the gain setting unit 66 is carried out on the behavior of the vehicle 1 observed from the Y-axis direction and on the behavior of the vehicle 1 observed from the X-axis direction, respectively, in the same manner. Hence, the reference characters with the suffix "_#" are used in FIG. 11 to FIG. 14, as with the case of FIG. 6.

The gain setting unit 66 first acquires the value (measurement value) of the current tilt angle θb_act_# and the value (measurement value) of the current inclination angular velocity ωb_act_# of the mounting section 3 based on a detection signal of the tilt sensor 52, a current occupied/unoccupied estimation result, and a current oscillation estimation result.

Using the acquired values, the gain setting unit 66 carries out, in a tilt error determining unit 66a, the processing of determining whether or not the amounts of deviations of the tilt angle θb_act_# and the inclination angular velocity ωb_act_# of the mounting section 3 from the desired values thereof (hereinafter referred to as "the tilt error") are appropriate magnitudes (magnitudes that are not excessive).

Figure 12:
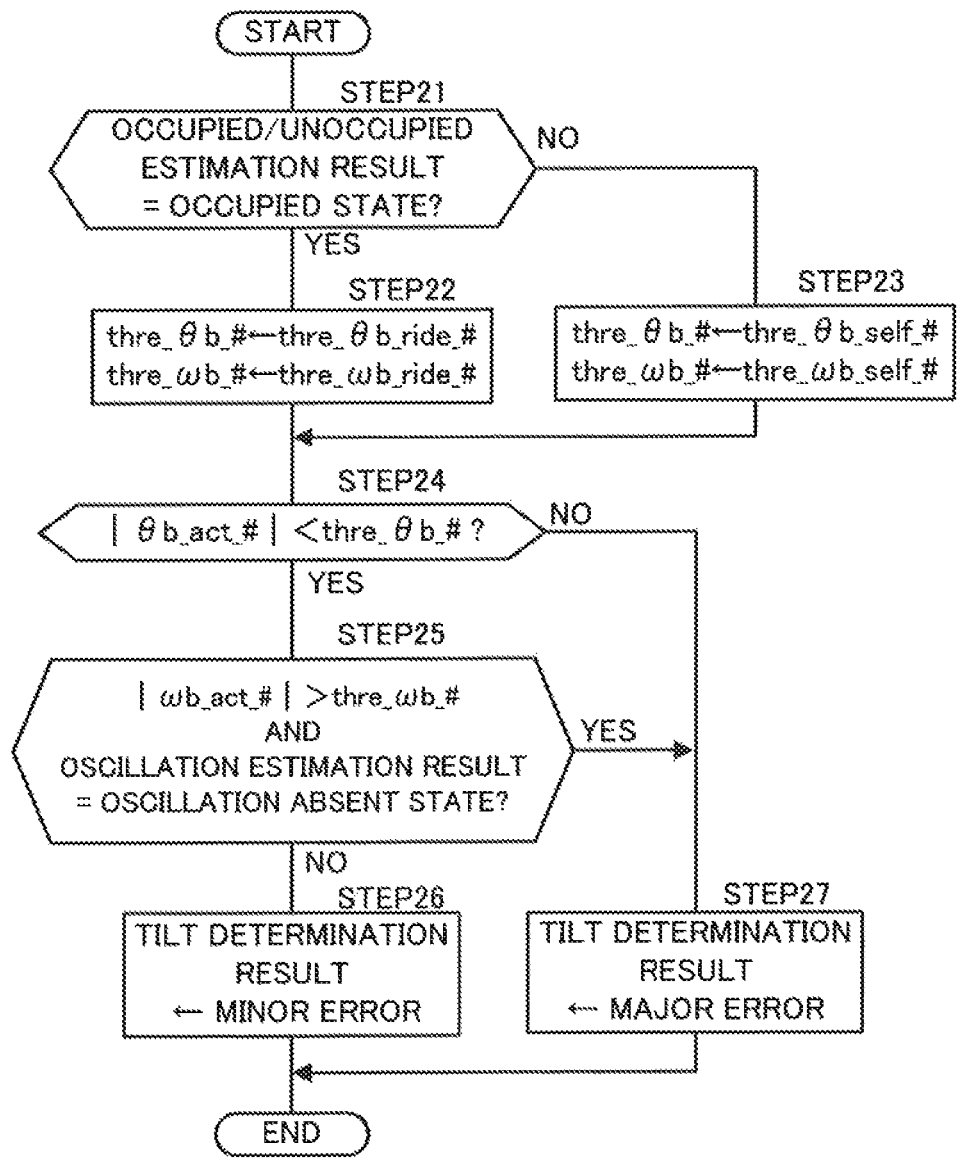
FIG. 12 is a flowchart illustrating the processing by a tilt error determining unit illustrated in FIG. 11.

The processing is carried out as illustrated by the flowchart of FIG. 12.

The gain setting unit 66 first determines in STEP21 whether or not the occupied/unoccupied estimation result is the occupied state.

Then, according to the determination result, the gain setting unit 66 sets a threshold value thre_θb_#, which is to be compared with the value of the tilt error associated with the tilt angle θb_act_# of the mounting section 3, and a threshold value thre_ωb_#, which is to be compared with the value of the tilt error associated with the inclination angular velocity ωb_act_#.

Specifically, if the determination result in STEP21 is affirmative (i.e. if the occupied/unoccupied estimation result is the occupied state), then the gain setting unit 66 sets in STEP22 the predetermined values thre_θb_ride_# and thre_ωb_ride_#, which are set in advance for the occupied state, as the values of the threshold values thre_θb_# and thre_ωb_#, respectively.

Further, if the determination result in STEP21 is negative (i.e. if the occupied/unoccupied estimation result is the unoccupied state), then the gain setting unit 66 sets in STEP23 the predetermined values thre_θb_self_# and thre_ωb_self_#, which are set in advance for the unoccupied state, as the values of the threshold values thre_θb_# and thre_ωb_#, respectively.

In this case, it is considered that the magnitude of the tilt error in the occupied state is desirably much smaller than in the unoccupied state. For this reason, the predetermined values thre_θb_ride_# and thre_ωb_ride_# for the occupied state are set to be smaller than the predetermined values thre_θb_self_# and thre_ωb_self_#, respectively, for the unoccupied state.

In the present embodiment, the desired value of the tilt angle θb_act_# (=the desired tilt angle θb_cmd_#) of the mounting section 3 and the desired value of the inclination angular velocity ωb_act_# are both zero. Therefore, the absolute value |θb_act_#| of the value of the current tilt angle θb_act_# of the mounting section 3 and the absolute value |ωb_act_#| of the value of the current inclination angular velocity ωb_act_# are used as the values that indicate the magnitude of the tilt error associated with the tilt angle θb_act_# and the magnitude of the tilt error associated with the inclination angular velocity ωb_act_#, respectively.

Subsequently, the gain setting unit 66 determines in STEP24 whether or not the tilt error |θb_act_#| associated with the tilt angle θb_act_# of the mounting section 3 is smaller than the threshold value thre_θb_# set in STEP22 or STEP23.

If the determination result is negative, then |θb_act_#| is relatively large, so that the gain setting unit 66 determines "major error" as the determination result related to the tilt error (hereinafter referred to as "the tilt determination result") in STEP27.

Further, if the determination result in STEP24 is affirmative, then the gain setting unit 66 determines in STEP25 whether or not a condition is satisfied in that the tilt error |ωb_act_#| related to the inclination angular velocity ωb_act_# of the mounting section 3 is larger than the threshold value thre_ωb_# set in STEP22 or STEP23 and that the oscillation estimation result is the oscillation absent state.

If the determination result is negative, then it means that |ωb_act_#| is relatively small or the oscillation estimation result is the oscillation present state, so that the gain setting unit 66 determines "minor error" as the tilt determination result in STEP26.

If the determination result in STEP25 is affirmative, then the gain setting unit 66 determines "major error" as the tilt determination result in STEP27.

The above has described the processing carried out by the gain setting unit 66 by using the tilt error determining unit 66a. In this processing, the tilt determination result is determined as "major error" in the case where the tilt error |θb_act_#| associated with the tilt angle θb_act_# of the mounting section 3 is larger than threshold value thre_θb_# or in the case where the tilt error |ωb_act_#| associated with the inclination angular velocity ωb_act_# of the mounting section 3 is larger than the threshold value thre_ωb_#, and the oscillation estimation result indicates the oscillation absent state.

Further, the tilt determination result is determined as "minor error" in the case where the tilt error |ωb_act_#| is smaller than the threshold value thre_θb_# and the tilt error |ωb_act_#| is smaller than the threshold value thre_ωb_#, or the oscillation estimation result indicates the oscillation present state.

If the oscillation estimation result is the oscillation present state, the tilt determination result is determined as the minor error in order to prevent the gain values Kvb_#, Kth_# and Kw_# (#=x or y) from being further increased by the processing carried out by the gain setting unit 66, which processing will be discussed hereinafter.

Referring back to FIG. 11, the gain setting unit 66 then carries out the processing of determining a first gain manipulated variable kp_ratio_1_# and the processing of determining a second gain manipulated variable kp_ratio_2_# in a first gain manipulated variable determining unit 66b and a second gain manipulated variable determining unit 66c, respectively.

The first gain manipulated variable kp_ratio_1_# is a manipulated variable for increasing or decreasing the gain values Kvb_#, Kth_# and Kw_# mainly according to the tilt state of the mounting section 3, and the second gain manipulated variable kp_ratio_2_# is a manipulated variable for increasing or decreasing the gain values Kvb_#, Kth_# and Kw_# mainly according to the oscillation estimation result.

Further, kp_ratio_1_# and kp_ratio_2_# in the present embodiment both take values in the range from zero to 1. Both kp_ratio_1_# and kp_ratio_2_# are manipulated variables that function to increase the gain values Kvb_#, Kth_and Kw_# as the values of the manipulated variables increase.

Figure 13:
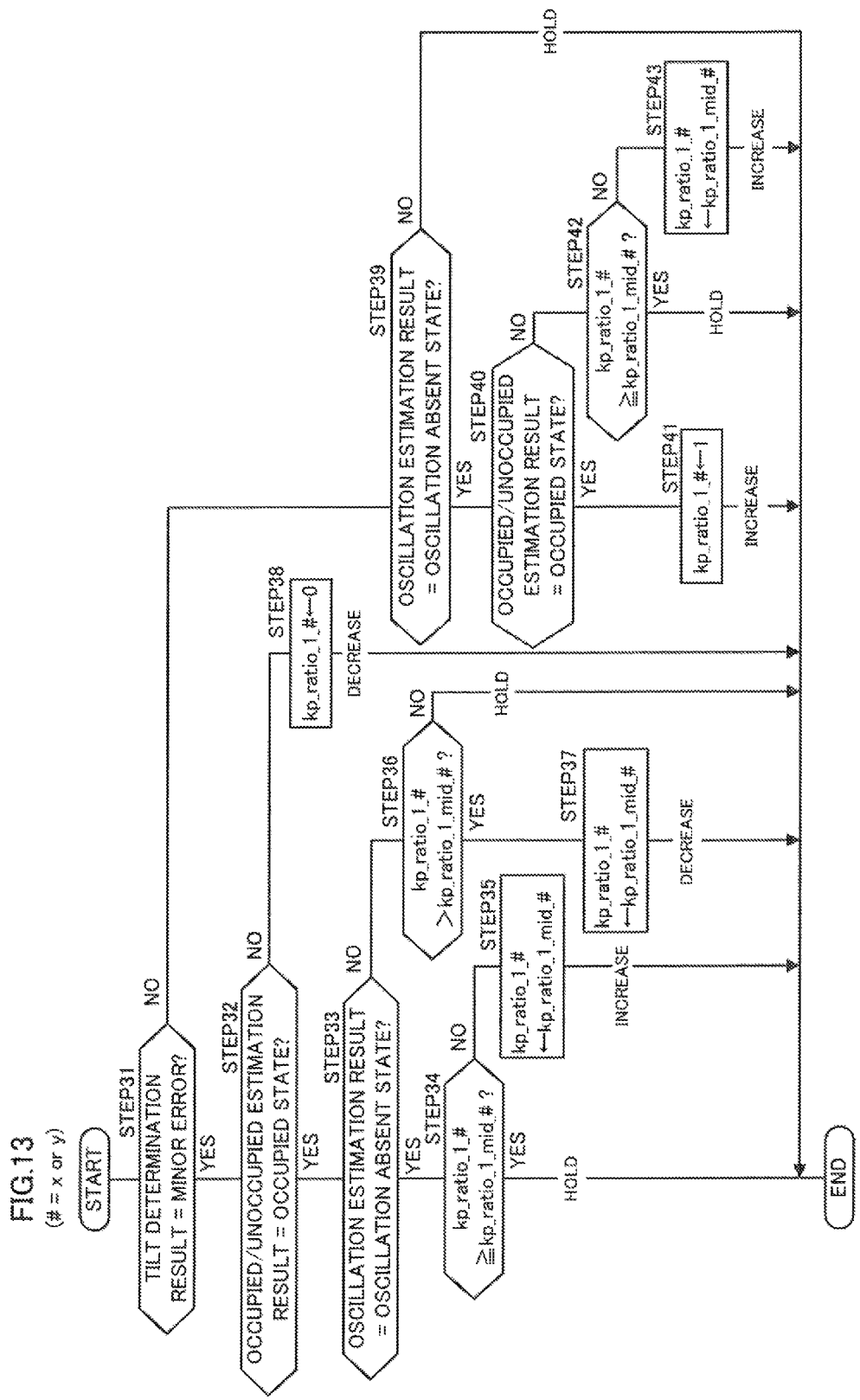
FIG. 13 is a flowchart illustrating the processing by a first gain manipulated variable determining unit illustrated in FIG. 11.

The processing by the gain setting unit 66 through the first gain manipulated variable determining unit 66b is carried out as illustrated in FIG. 13.

First, in STEP31, the gain setting unit 66 determines whether or not the tilt determination result is the minor error.

If the determination result in STEP31 is affirmative, then the gain setting unit 66 determines in STEP32 whether or not the occupied/unoccupied estimation result is the occupied state.

If the determination result in STEP32 is affirmative, then the gain setting unit 66 determines in STEP33 whether or not the oscillation estimation result is the oscillation absent state.

If the determination result in STEP33 is affirmative, then the gain setting unit 66 determines in STEP34 whether or not the current value of the first gain manipulated variable kp_ratio_1_# is a value equal to or more than a predetermined value kp_ratio_1_mid_# established in advance.

The predetermined value kp_ratio_1_mid_# is an intermediate value (e.g. 0.5) between a maximum value (=1) and a minimum value (=0) of kp_ratio_1_#. The value corresponds to an appropriate lower limit value of the first gain manipulated variable kp_ratio_1_# when the vehicle 1 is in the occupied state.

If the determination result in STEP34 is affirmative, then the gain setting unit 66 terminates the processing in the first gain manipulated variable determining unit 66b at the current control processing cycle without changing the value of the first gain manipulated variable kp_ratio_1_#.

Thus, the first gain manipulated variable kp_ratio_1_# is maintained (held) at a current value in the case where the tilt determination result is the minor error, the occupied/unoccupied estimation result is the occupied state, the oscillation estimation result is the oscillation absent state, and the current value of the first gain manipulated variable kp_ratio_1_# is an ideal value, which is equal to or more than the predetermined value kp_ratio_1_mid_# (i.e. in the case where the vehicle 1 is in the occupied state and normally operating).

Further, if the determination result in STEP34 is negative, then the gain setting unit 66 changes the value of the first gain manipulated variable kp_ratio_1_# to the predetermined value kp_ratio_1_mid_# in STEP35. This causes the value of the first gain manipulated variable kp_ratio_1_# to increase so as to increase the gain values Kvb_#, Kth_# and Kw_#.

If the determination result in STEP33 is negative (if the oscillation estimation result is the oscillation present state), then the gain setting unit 66 determines in STEP36 whether or not the current value of the first gain manipulated variable kp_ratio_1_# is larger than the predetermined value kp_ratio_1_mid_#.

If the determination result in STEP36 is affirmative, then it is considered that the oscillation estimation result has indicated the oscillation present state due to the gain values Kvb_#, Kth_# and Kw_# being excessive.

In this case, therefore, the gain setting unit 66 changes the value of the first gain manipulated variable kp_ratio_1_# to the predetermined value kp_ratio_1_mid_# in STEP37. This causes the value of the first gain manipulated variable kp_ratio_1_# to be decreased so as to decrease the gain values Kvb_#, Kth_# and Kw_#.

Further, if the determination result in STEP36 is negative, then the gain setting unit 66 terminates the processing in the first gain manipulated variable determining unit 66b at the current control processing cycle without changing the value of the first gain manipulated variable kp_ratio_1_#. Thus, the value of the first gain manipulated variable kp_ratio_1_# is maintained (held) at the current value.

If the determination result in STEP32 is negative (if the occupied/unoccupied estimation result is the unoccupied state), then the gain setting unit 66 changes the value of the first gain manipulated variable kp_ratio_1_# to zero (the minimum value) in STEP38.

Hence, if the occupied/unoccupied estimation result is the unoccupied state in the situation in which the tilt determination result is the minor error, then the value of the first gain manipulated variable kp_ratio_1_# is decreased so as to decrease the gain values Kvb_#, Kth_# and Kw_#.

If the determination result in STEP31 is negative (if the tilt determination result is the major error), then the gain setting unit 66 further determines in STEP39 whether or not the oscillation estimation result is the oscillation absent state.

If the determination result in STEP39 is affirmative, then the gain setting unit 66 determines in STEP40 whether or not the occupied/unoccupied estimation result is the occupied state.

If the determination result in STEP40 is affirmative, then the gain setting unit 66 changes the value of the first gain manipulated variable kp_ratio_1_# to 1 (the maximum value) in STEP41.

Hence, if the oscillation estimation result is the oscillation absent state and the occupied/unoccupied estimation result is the occupied state in the situation in which the tilt determination result is the major error, then the value of the first gain manipulated variable kp_ratio_1_# is increased so as to increase the gain values Kvb_#, Kth_# and Kw_#.

Further, if the determination result in STEP40 is negative (if the occupied/unoccupied estimation result is the unoccupied state), then the gain setting unit 66 determines in STEP42 whether or not the current value of the first gain manipulated variable kp_ratio_1_# is equal to or larger than the predetermined value kp_ratio_1_mid_#.

If the determination result in STEP42 is affirmative, then the gain setting unit 66 terminates the processing in the first gain manipulated variable determining unit 66b at the current control processing cycle without changing the value of the first gain manipulated variable kp_ratio_1_#. Thus, the first gain manipulated variable kp_ratio_1_# is maintained (held) at the current value.

Further, if the determination result in STEP42 is negative, then the gain setting unit 66 changes the value of the first gain manipulated variable kp_ratio_1_# to the predetermined value kp_ratio_1_mid_# in STEP43. This causes the value of the first gain manipulated variable kp_ratio_1_# to be increased so as to increase the gain values Kvb_#, Kw_# and Kth_#.

Further, if the determination result in STEP39 is negative (if the oscillation estimation result is the oscillation present state), then the gain setting unit 66 terminates the processing in the first gain manipulated variable determining unit 66b at the current control processing cycle without changing the value of the first gain manipulated variable kp_ratio_1_#. Thus, the first gain manipulated variable kp_ratio_1_# is maintained (held) at the current value.

The above has described the processing carried out by the gain setting unit 66 through the first gain manipulated variable determining unit 66b.

By this processing, the value of the first gain manipulated variable kp_ratio_1_# is maintained at a large value equal to or larger than the predetermined value kp_ratio_1_mid_# if the vehicle 1 is in the occupied state.

Further, if the tilt error determination result is the minor error in the unoccupied state, then the value of the first gain manipulated variable kp_ratio_1_# is set to the minimum value (0).

Further, if the tilt error determination result is the major error, i.e. if the tilt angle θb_act_# or the inclination angular velocity ωb_act_# of the mounting section 3 is apart from the desired value thereof, then the value of the first gain manipulated variable kp_ratio_1_# is maintained to a value that is equal to or larger than the predetermined value kp_ratio_1_mid_# so as to promptly bring the tilt angle θb_act_# or the inclination angular velocity ωb_act_# to the desired value thereof except for the oscillation present state.

In order to smoothly change the value of the first gain manipulated variable kp_ratio_1_#, the first gain manipulated variable kp_ratio_1_# determined as described above may be, for example, passed through a first-order lag filter to determine the first gain manipulated variable kp_ratio_1_# to be actually used.

Figure 14:
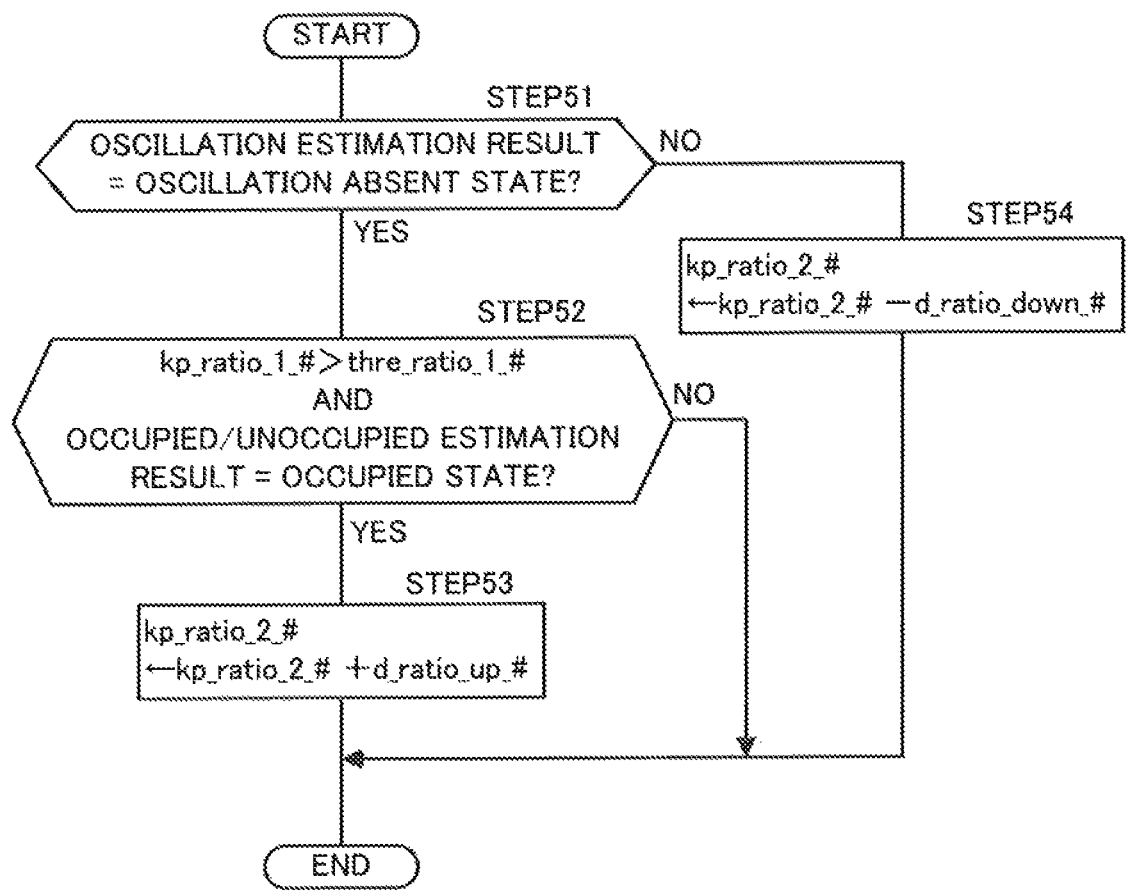
FIG. 14 is a flowchart illustrating the processing by a second gain manipulated variable determining unit illustrated in FIG. 11.

The processing by the gain setting unit 66 through the second gain manipulated variable determining unit 66c is carried out as illustrated in FIG. 14.

First, in STEP51, the gain setting unit 66 determines whether or not the oscillation estimation result is the oscillation absent state.

If the determination result is negative (if the oscillation estimation result is the oscillation present state), then the gain setting unit 66 decreases in STEP54 the second gain manipulated variable kp_ratio_2_# by a predetermined positive value d_ratio_down_#, which is established in advance, from a current value so as to decrease the gain values Kvb_#, Kth_# and Kw_#.

The processing of decreasing the second gain manipulated variable kp_ratio_2_# in STEP54 is carried out with zero (the minimum value of kp_ratio_2_#) being set as the lower limit. In other words, if the value obtained by subtracting d_ratio_down_# from the current value is smaller than zero, then the value of kp_ratio_2_# is set to zero.

If the determination result in STEP51 is affirmative (if the oscillation estimation result is the oscillation absent state), then the gain setting unit 66 determines in STEP52 whether or not a condition is satisfied in that the current value of the first gain manipulated variable kp_ratio_1_# is larger than the predetermined threshold value thre_ratio_1_# and the occupied/unoccupied estimation result is the occupied state. The threshold value thre_ratio_1_# is a value that has been set such that kp_ratio_1_#>thre_ratio_# applies in the case where the tilt angle θb_act_# (the observation value) of the mounting section 3 is relatively large. In this case, thre_ratio_1_# is set within a range in which a relationship denoted by 1>thre_ratio_1_#_kp_ratio_1_mid# applies.

Further, if the determination result is affirmative, then the gain setting unit 66 increments in STEP53 the value of the second gain manipulated variable kp_ratio_2_# by a predetermined positive value d_ratio_up_#, which is established in advance, from the current value so as to increase the gain values Kvb_#, Kth_# and Kw_#.

The processing of incrementing the second gain manipulated variable kp_ratio_2_# in STEP53 is carried out with 1 (the maximum value of kp_ratio_2_#) being set as the upper limit. In other words, if the value obtained by adding d_ratio_down_# to the current value is larger than 1, then the value of kp_ratio_2_# is set to 1.

Further, if the determination result in STEP52 is negative, then the gain setting unit 66 terminates the processing in the second gain manipulated variable determining unit 66c at the current control processing cycle without changing the value of the second gain manipulated variable kp_ratio_2_#. Thus, the second gain manipulated variable kp_ratio_2_# is maintained at the current value.

The above has described the processing carried out by the gain setting unit 66 through the second gain manipulated variable determining unit 66c.

This processing increases the second gain manipulated variable kp_ratio_2_# in the oscillation absent state except for the case where the vehicle 1 is occupied and the second gain manipulated variable kp_ratio_2_# has already exceeded the threshold value thre_ratio_1_#.

Further, in the oscillation present state, the second gain manipulated variable kp_ratio_2_# is decremented.

Referring back to FIG. 11, the gain setting unit 66 then carries out, in an arithmetic unit 66d, the processing of multiplying the first gain manipulated variable kp_ratio_1_# and the second gain manipulated variable kp_ratio_2_# determined as described above, thereby calculating a gain manipulated variable kp_ratio_#, which combines these two gain manipulated variables.

The gain manipulated variable kp_ratio_# may be determined from the first gain manipulated variable kp_ratio_1_# and the second gain manipulated variable kp_ratio_2_# by using, for example, a map.

Subsequently, the gain setting unit 66 carries out the arithmetic processing in an arithmetic unit 66e by using the gain manipulated variable kp_ratio_# to determine the gain values Kvb_#, Kth_# and Kw_#.

The arithmetic processing is carried out according to expressions (6a) to (6c).

$$Kvb\_\# = (1-kp\_ratio\_\#)*Kvb\_\#\_self + kp\_ratio\_\#*Kvb\_\#\_ride \quad (6a)$$

$$Kth\_\# = (1-kp\_ratio\_\#)*Kth\_\#\_self + kp\_ratio\_\#*Kth\_\#\_ride \quad (6b)$$

$$Kw\_\# = (1-kp\_ratio\_\#)*Kw\_\#\_self + kp\_ratio\_\#*Kw\_\#\_ride \quad (6c)$$

In FIG. 11, the reference characters "Kvb," "Kth," and "Kw" related to the gain values Kvb_#, Kth_# and Kw_# are generically denoted by "K."

In the above expressions, Kvb_#_self, Kth_#_self and Kw_# self denote values set in advance as the values of the ideal gain values Kvb_#, Kth_t and Kw_#, respectively, when the vehicle 1 is in the unoccupied state, and Kvb_#_ride, Kth_#_ride and Kw_#_ride denote values set in advance as the values of the ideal gain values Kvb_#, Kth_# and Kw_#, respectively, when the vehicle 1 is in the occupied state. In this case, Kvb_#_ride>Kvb_#_self, Kth_f_ride>Kth_f_self, and Kw_#_ride>Kw_#_self apply.

Accordingly, the gain value Kvb_# is calculated as a weighted mean value of the gain value for the unoccupied state Kvb_#_self and the gain value for the occupied state Kvb_#_ride (a weighted mean value using (1-kp_ratio_#)

and kp_ratio_# as the weight coefficients). The same applies to the gain values Kth_# and Kw_#.

In this case, the gain value Kvb_# becomes closer to the gain value for the occupied state Kvb_#_ride as the gain manipulated variable kp_ratio_# becomes closer to 1, and becomes closer to the gain value for the unoccupied state Kvb_#_self as the gain manipulated variable kp_ratio_# becomes closer to zero. The same applies to the gain values Kth_# and Kw_#.

Accordingly, the gain values Kvb_#, Kth_# and Kw_# increase as the gain manipulated variable kp_ratio_# increases.

The above has described in detail the processing by the gain setting unit 66 related to the behaviors of the vehicle 1 observed from each of the Y-axis direction and the X-axis direction.

Each of the gain values Kvb_#, Kth_# and Kw_# may be determined from the gain manipulated variable kp_ratio_# by using a map.

As described above, the gain values Kvb_#, Kth_# and Kw_# are adjusted as appropriate according to the tilt determination result, the occupied/unoccupied estimation result and the oscillation estimation result.

In this case, basically, if the tilt determination result is the major error or if the oscillation estimation result is the oscillation present state, then the gain values Kvb_#, Kth_# and Kw_# are adjusted to cancel the state. Further, in the unoccupied state, the adjustment is made to prevent the gain values Kvb_#, Kth_# and Kw_# from becoming excessive.

For example, in the unoccupied state, unless the tilt determination result is the major error, the first gain manipulated variable kp_ratio_1_# is set to zero (STEP38), so that all of the gain values Kvb_#, Kth_# and Kw_# are maintained at the minimum values (Kvb_#_self, Kth_#_self and Kw_#_self).

Further, in the oscillation present state, the first gain manipulated variable kp_ratio_1_# will not be increased and the second gain manipulated variable kp_ratio_2_# will be sequentially decreased (STEP54). Therefore, in the oscillation present state, the gain values Kvb_#, Kth_# and Kw_# will be decreased until the oscillation present state is cleared, i.e. until the state is switched to the oscillation absent state.

Further, in the oscillation absent state, regardless of whether the tilt determination result is the minor error or the major error, the gain values Kvb_#, Kth_# and Kw_# in the case of the occupied state are set to values that are larger than those in the case of the unoccupied state.

Further, in the oscillation absent state, if the tilt determination result is the major error, then the gain values Kvb_#, Kth_# and Kw_# are all increased to the maximum values (Kvb_#_ride, Kth_#_ride and Kw_#_ride) or maintained at the maximum values in the case of the occupied state.

Further, in the oscillation absent state, if the tilt determination result is the major error in the case of the unoccupied state, then the gain values Kvb_#, Kth_# and Kw_# are all increased within a range (more specifically, within a range that is equal to or less than the values calculated by substituting the values of kp_ratio_1_mid_# into kp_ratio_# in the foregoing expressions (6a) to (6c)) that is smaller than the maximum values (Kvb_#_ride, Kth_#_ride and Kw_#_ride) until the first gain manipulated variable kp_ratio_1_# reaches the predetermined value kp_ratio_1_mid# by the processing in STEP43.

According to the embodiments described above, the processing of estimating whether the vehicle 1 is in the occupied state or the unoccupied state (the processing by the occupied/unoccupied estimating unit 62) and the processing of estimating whether the vehicle 1 is in the oscillation present state or the oscillation absent state (the processing by the oscillation estimating unit 64) can be carried out with high reliability.

Thus, adjusting the gain values Kvb_#, Kth_# and Kw_# (#=x or y) as described above according to the occupied/unoccupied estimation result, the oscillation estimation result and the tilt error determination result makes it possible to set ideal gain values Kvb_#, Kth_# and Kw_# (#=x or y) in situations of any combinations of the occupied/unoccupied estimation result, the oscillation estimation result and the tilt error determination result.

Thus, ideal behaviors of the vehicle 1 can be achieved in situations of any combinations of the occupied/unoccupied estimation result, the oscillation estimation result and the tilt error determination result.

Further, the restrictions on the mounting position, the mounting posture or the like of a rider on the mounting section 3 are mitigated, thus enabling the rider to secure a posture desirable to the rider. This permits a comfortable ride on the vehicle 1.

In the embodiments described above, the descriptions have been given of the vehicle 1 in which the mounting section 3 is a seat. Alternatively, however, the mounting section 3 may be configured such that a rider in a standing posture rests his or her feet thereon.

Further, in the embodiments, the descriptions have been given of the vehicle 1 in which the mounting section 3 tilts integrally with the base body 9. Alternatively, however, the vehicle can be configured, for example, such that the base body and the traveling unit installed to the base body do not tilt relative to a floor surface, but the mounting section tilts relative to the base body.

What is claimed is:

1. An inverted pendulum type vehicle comprising:
   a base body comprising a lower frame and a support frame attached to and extending upwardly from the lower frame,
   a traveling unit operatively attached to the lower frame and capable of traveling in a plurality of directions on a floor surface, the traveling unit comprising a centrally located wheel unit,
   an electric motor that drives the traveling unit, wherein the traveling unit and the electric motor are installed on the lower frame of the base body, with the electric motor disposed above the wheel unit,
   a current sensor for detecting an amount of electrical current supplied to the electric motor;
   a rider mounting section installed to the base body tiltably with respect to a vertical direction, the rider mounting section disposed at an upper end of the support frame, and
   a control unit that includes at least one processor and controls an operation of the electric motor, wherein the control unit comprises a first estimating unit that is configured to estimate whether or not a rider is on the vehicle, based on an observation value of an energizing current of the electric motor based on a detection signal from the current sensor, and a current command value, which is a command value of the energizing current of the electric motor determined by the control unit;
   and wherein the control unit is configured to control the operation of the electric motor according to an estimation result of the first estimating unit.

2. The inverted pendulum type vehicle according to claim 1, wherein the first estimating unit is configured to calculate an acceleration/deceleration current component of the current command value, which acceleration/deceleration current component is for increasing/decreasing a driving force output by the electric motor, and to estimate whether or not a rider is on the vehicle based on a reference current value obtained by subtracting the acceleration/deceleration current component from the observation value of the energizing current.

3. The inverted pendulum type vehicle according to claim 1, wherein:
two of the electric motors are provided, and a power transmission system between the traveling unit and the two electric motors is configured such that a driving force, for moving the traveling unit in a first direction, is generated based on a total sum of driving forces output by the two electric motors, and a driving force for moving the traveling unit in a second direction is generated based on a difference between the driving forces output by the two electric motors, where the second direction is orthogonal to the first direction, and
the first estimating unit is configured to
carry out processing of converting a pair of observation values of the energizing currents of the two electric motors into a pair of reference current values including a first direction reference current value, which denotes a current component that generates the driving force for moving the traveling unit in the first direction, and a second direction reference current value, which denotes a current component that generates the driving force for moving the traveling unit in the second direction,
and to estimate whether or not a rider is on the vehicle, based on the first direction reference current value and the second direction reference current value.

4. The inverted pendulum type vehicle according to claim 1, wherein:
two of the electric motors are provided, and a power transmission system between the traveling unit and the two electric motors is configured such that a driving force, for moving the traveling unit in a first direction, is generated based on a total sum of driving forces output by the two electric motors, and a driving force for moving the traveling unit in a second direction is generated based on a difference between the driving forces output by the two electric motors, where the second direction is orthogonal to the first direction, and
the first estimating unit is configured to carry out:
processing of converting a pair of observation values of the energizing currents of the two electric motors into a pair of reference current values including a first direction reference current value, which denotes a current component that generates the driving force for moving the traveling unit in the first direction, and a second direction reference current value, which denotes a current component that generates the driving force for moving the traveling unit in the second direction,
processing of calculating acceleration/deceleration current components of current command values of the two electric motors, the acceleration/deceleration current components being provided for changing the driving forces output by the electric motors, and
processing of converting a pair of acceleration/deceleration current components of the two electric motors into a pair of a first direction acceleration/deceleration current value, which denotes a current component that generates a driving force for moving the traveling unit in the first direction, and a second direction acceleration/deceleration current value, which denotes a current component that generates a driving force for moving the traveling unit in the second direction,
and to estimate whether or not a rider is on the vehicle based on a first direction reference current value obtained by subtracting the first direction acceleration/deceleration current value from the first direction current value and a second direction reference current value obtained by subtracting the second direction acceleration/deceleration current value from the second direction current value.

5. The inverted pendulum type vehicle according to claim 2, wherein:
two of the electric motors are provided, and a power transmission system between the traveling unit and the two electric motors is configured such that such that a driving force, for moving the traveling unit in a first direction, is generated based on a total sum of output torques of the two electric motors, and a driving force for moving the traveling unit in a second direction is generated based on a difference between the driving forces output by the two electric motors, where the second direction is orthogonal to the first direction, and
the first estimating unit is configured to
carry out processing of converting a pair of observation values of the energizing currents of the two electric motors into a pair of reference current values including a first direction reference current value, which denotes a current component that generates the driving force for moving the traveling unit in the first direction, and a second direction reference current value, which denotes a current component that generates the driving force for moving the traveling unit in the second direction,
and to estimate whether or not a rider is on the vehicle, based on the first direction reference current value and the second direction reference current value.

6. The inverted pendulum type vehicle according to claim 3, wherein the first estimating unit is configured to estimate whether or not a rider is on the vehicle based on a first a reference value obtained by smoothing the first direction reference current value, a first b reference value obtained by smoothing a value denoting a magnitude of the first direction reference current value, a second a reference value obtained by smoothing the second direction reference current value, and a second b reference value obtained by smoothing a value denoting the magnitude of the second direction reference current value.

7. The inverted pendulum type vehicle according to claim 4, wherein the first estimating unit is configured to estimate whether or not a rider is on the vehicle based on a first a reference value obtained by smoothing the first direction reference current value, a first b reference value obtained by smoothing a value denoting a magnitude of the first direction reference current value, a second a reference value obtained by smoothing the second direction reference current value, and a second b reference value obtained by smoothing a value denoting the magnitude of the second direction reference current value.

8. The inverted pendulum type vehicle according to claim 5, wherein the first estimating unit is configured to estimate whether or not a rider is on the vehicle based on a first a reference value obtained by smoothing the first direction reference current value, a first b reference value obtained by smoothing a value denoting a magnitude of the first direction reference current value, a second a reference value obtained by smoothing the second direction reference current value, and a second b reference value obtained by smoothing a value denoting the magnitude of the second direction reference current value.

9. The inverted pendulum type vehicle according to claim 1, further comprising a second estimating unit that estimates whether or not an oscillation phenomenon of the vehicle has taken place based on an estimation result of the first estimating unit, an observation value of a traveling velocity of the traveling unit, and an observation value of an inclination angular velocity of the rider mounting section, wherein the control unit is configured to control the operation of the electric motor based on an estimation result of the second estimating unit.

10. The inverted pendulum type vehicle according to claim 9, wherein the control unit is configured to control the operation of the electric motor according to an estimation result of the first estimating unit and an estimation result of the second estimating unit.

11. The inverted pendulum type vehicle according to claim 9, wherein the second estimating unit is configured to determine a correlation reference value, which indicates a degree of correlation between a value obtained by passing a travel acceleration of the traveling unit calculated from the observation value of the traveling velocity of the traveling unit through a filter of high pass characteristics and a value obtained by passing the observation value of the inclination angular velocity of the rider mounting section through a filter of high pass characteristics, and to compare the correlation reference value with a threshold value set based on an estimation result of the first estimating unit so as to estimate whether or not the oscillation phenomenon of the vehicle has occurred.

* * * * *